US010695711B2

(12) United States Patent
McCool et al.

(10) Patent No.: US 10,695,711 B2
(45) Date of Patent: Jun. 30, 2020

(54) REMOTE MONITORING OF ADSORBER PROCESS UNITS

(71) Applicant: UOP LLC, Des Plaines, IL (US)

(72) Inventors: Ryan McCool, Chicago, IL (US); Chad E. Bjorklund, Schaumburg, IL (US); Jorge Charr, Katy, TX (US); Luk Verhulst, Schoten (BE)

(73) Assignee: UOP LLC, Des Plaines, IL (US)

( * ) Notice: Subject to any disclaimer, the term of this patent is extended or adjusted under 35 U.S.C. 154(b) by 189 days.

(21) Appl. No.: 15/963,840

(22) Filed: Apr. 26, 2018

(65) Prior Publication Data

US 2018/0311609 A1 Nov. 1, 2018

Related U.S. Application Data

(60) Provisional application No. 62/491,785, filed on Apr. 28, 2017.

(51) Int. Cl.
*B01D 53/04* (2006.01)
*G05B 19/4063* (2006.01)
(Continued)

(52) U.S. Cl.
CPC ..... *B01D 53/0454* (2013.01); *B01D 53/0438* (2013.01); *B01D 53/0446* (2013.01);
(Continued)

(58) Field of Classification Search
CPC ............... B01D 53/04; B01D 53/0438; B01D 53/0446; B01D 53/0454; B01D 2256/245;
(Continued)

(56) References Cited

U.S. PATENT DOCUMENTS 3,540,188 A * 11/1970 Barrere, Jr. ........ B01D 53/0454
95/12
4,159,239 A 6/1979 Schwartz ..................... 208/113
(Continued)

FOREIGN PATENT DOCUMENTS

EP 0181744 A1 5/1986 ............. B65G 53/66
EP 2746884 A1 6/2014 ............. G05B 23/02
(Continued)

OTHER PUBLICATIONS

U.S. Appl. No. 15/058,658, filed Mar. 3, 2015, Ian G. Horn Zak Alzein Paul Kowalczyk Christophe Romatier, System and Method for Managing Web-Based Refinery Performance Optimization Using Secure Cloud Computing.
(Continued)

*Primary Examiner* — Frank M Lawrence, Jr.

(57) ABSTRACT

Adsorbers have many purposes in chemical, gas-processing, and petrochemical plants. Adsorbers may be used to remove components from gas streams. Adsorbers may be subjected to various issues, including but not limited to moisture breakthrough, spent catalyst, too high or too low pressure drop, over or under heating, over or under cooling, too high or too low flow rates, which can affect their performance or result in a shutdown of the adsorbers. Monitoring the adsorbers and the processes using adsorbers may be performed to determine if the adsorbent bed is reaching saturation, other problems are occurring, or if equipment failures are imminent. Monitoring also helps to predict behavior or problems in different adsorbers used in the same plant or in other plants and/or processes.

20 Claims, 14 Drawing Sheets

(51) Int. Cl.
   *G05B 19/401* (2006.01)
   *C10L 3/10* (2006.01)
   *G05B 19/414* (2006.01)

(52) U.S. Cl.
   CPC ............ *C10L 3/103* (2013.01); *G05B 19/401* (2013.01); *G05B 19/4063* (2013.01); *B01D 2256/245* (2013.01); *B01D 2257/304* (2013.01); *B01D 2257/306* (2013.01); *B01D 2257/504* (2013.01); *B01D 2257/602* (2013.01); *B01D 2257/702* (2013.01); *B01D 2257/80* (2013.01); *B01D 2259/403* (2013.01); *B01D 2259/40009* (2013.01); *B01D 2259/40088* (2013.01); *C10L 2290/08* (2013.01); *C10L 2290/542* (2013.01); *C10L 2290/58* (2013.01); *G05B 19/4148* (2013.01); *G05B 2219/31457* (2013.01)

(58) Field of Classification Search
   CPC ........ B01D 2257/304; B01D 2257/306; B01D 2257/504; B01D 2257/602; B01D 2257/702; B01D 2257/80; B01D 2259/40009; B01D 2259/40088; B01D 2259/403; C10L 3/03; C10L 2290/08; C10L 2290/542; C10L 2290/58; G05B 19/401; G05B 19/4063; G05B 19/4148; G05B 2219/31457
   USPC ............ 95/1, 8, 11, 90, 95, 96; 96/109, 111, 96/115, 116, 117
   See application file for complete search history.

(56) References Cited

U.S. PATENT DOCUMENTS

| | | | | |
|---|---|---|---|---|
| 4,267,458 | A | 5/1981 | Uram | 290/40 R |
| 4,284,494 | A | 8/1981 | Bartholic | 208/164 |
| 4,362,614 | A | 12/1982 | Asdigian | 208/235 |
| 4,380,146 | A | 4/1983 | Yannone | 60/39.281 |
| 4,385,985 | A | 5/1983 | Gross | 208/113 |
| 4,411,773 | A | 10/1983 | Gross | 208/159 |
| 4,709,546 | A | 12/1987 | Weiler | 415/116 |
| 4,718,020 | A * | 1/1988 | Duich | B01D 53/0454 700/271 |
| 4,775,460 | A | 10/1988 | Reno | |
| 4,795,545 | A | 1/1989 | Schmidt | |
| 4,902,469 | A | 2/1990 | Watson | 376/216 |
| 5,077,252 | A | 12/1991 | Owen et al. | 502/43 |
| 5,227,121 | A | 7/1993 | Scarola | 340/525 |
| 5,582,684 | A | 12/1996 | Holmqvist et al. | 162/49 |
| 5,605,435 | A | 2/1997 | Haugen | 137/514 |
| 5,616,214 | A | 4/1997 | Leclerc | 162/49 |
| 5,642,296 | A | 6/1997 | Saxena | 216/84 |
| 5,666,297 | A | 9/1997 | Britt et al. | 364/578 |
| 5,817,517 | A | 10/1998 | Perry et al. | 436/55 |
| 6,038,540 | A | 3/2000 | Krist et al. | 705/8 |
| 6,081,230 | A | 6/2000 | Hoshino | 342/357.32 |
| 6,230,486 | B1 | 5/2001 | Yasui | 123/674 |
| 6,266,605 | B1 | 7/2001 | Yasui | 60/276 |
| 6,271,845 | B1 | 8/2001 | Richardson | 715/764 |
| 6,392,114 | B1 | 5/2002 | Shields et al. | 582/719 |
| 6,760,716 | B1 | 7/2004 | Ganesamoorthi et al. | 706/21 |
| 6,772,044 | B1 | 8/2004 | Mathur et al. | 700/204 |
| 6,795,798 | B2 | 9/2004 | Eryurek et al. | 702/188 |
| 6,982,032 | B2 | 1/2006 | Shaffer et al. | 210/101 |
| 6,983,227 | B1 | 1/2006 | Thalhammer-Reyero | |
| 7,006,889 | B2 | 2/2006 | Mathur et al. | 700/204 |
| 7,067,333 | B1 | 6/2006 | Pasadyn | 438/5 |
| 7,133,807 | B2 | 11/2006 | Karasawa | 702/188 |
| 7,151,966 | B1 | 12/2006 | Baier et al. | 700/19 |
| 7,246,039 | B2 | 7/2007 | Moorhouse | 702/185 |
| 7,313,447 | B2 | 12/2007 | Hsuing et al. | 700/9 |
| 7,415,357 | B1 | 8/2008 | Stluka et al. | 702/6 |
| 7,567,887 | B2 | 7/2009 | Emigholz et al. | 702/182 |
| 7,742,833 | B1 | 6/2010 | Herbst et al. | 700/108 |
| 7,836,941 | B2 | 11/2010 | Song et al. | |
| 7,877,596 | B2 | 1/2011 | Foo Kune et al. | 713/153 |
| 7,925,979 | B2 | 4/2011 | Forney et al. | 715/733 |
| 7,936,878 | B2 | 5/2011 | Kune et al. | 380/270 |
| 7,979,192 | B2 | 7/2011 | Morrison et al. | |
| 7,995,526 | B2 | 8/2011 | Liu et al. | 370/329 |
| 8,050,889 | B2 | 11/2011 | Fluegge et al. | 702/182 |
| 8,055,371 | B2 | 11/2011 | Sanford et al. | 700/108 |
| 8,111,619 | B2 | 2/2012 | Liu et al. | 370/229 |
| 8,128,808 | B2 | 3/2012 | Hassan et al. | 208/209 |
| 8,204,717 | B2 | 6/2012 | McLaughlin et al. | 702/188 |
| 8,244,384 | B2 | 8/2012 | Pachner et al. | 700/30 |
| 8,280,057 | B2 | 10/2012 | Budampati et al. | 380/270 |
| 8,352,049 | B2 | 1/2013 | Hsiung et al. | |
| 8,354,081 | B2 | 1/2013 | Wheat et al. | |
| 8,385,436 | B2 | 2/2013 | Holm et al. | 375/260 |
| 8,428,067 | B2 | 4/2013 | Budampati et al. | 370/395.21 |
| 8,458,778 | B2 | 6/2013 | Budampati et al. | 726/6 |
| 8,571,064 | B2 | 10/2013 | Kore et al. | 370/469 |
| 8,630,962 | B2 | 1/2014 | Maeda | 706/12 |
| 8,644,192 | B2 | 2/2014 | Budampati et al. | 370/255 |
| 8,758,480 | B2 * | 6/2014 | Turnbull | B01D 53/047 128/204.21 |
| 8,811,231 | B2 | 8/2014 | Budampati et al. | 370/255 |
| 8,815,152 | B2 | 8/2014 | Burgess et al. | |
| 8,923,882 | B2 | 12/2014 | Gandhi et al. | 455/455 |
| 8,926,737 | B2 | 1/2015 | Chatterjee et al. | |
| 9,053,260 | B2 | 6/2015 | Romatier et al. | |
| 9,134,717 | B2 | 9/2015 | Trnka | |
| 9,166,667 | B2 | 10/2015 | Thanikachalam | |
| 9,176,498 | B2 | 11/2015 | Baramov | |
| 9,354,631 | B2 | 5/2016 | Mohideen et al. | |
| 9,571,919 | B2 | 2/2017 | Zhang et al. | |
| 9,580,341 | B1 | 2/2017 | Brown et al. | C02F 3/006 |
| 9,751,817 | B2 | 9/2017 | Jani et al. | |
| 9,864,823 | B2 | 1/2018 | Horn et al. | |
| 9,968,899 | B1 | 5/2018 | Gellaboina et al. | |
| 10,095,200 | B2 | 10/2018 | Horn et al. | |
| 10,107,295 | B1 | 10/2018 | Brecheisen | |
| 10,180,680 | B2 | 1/2019 | Horn et al. | |
| 10,183,266 | B2 | 1/2019 | Victor et al. | |
| 10,222,787 | B2 | 3/2019 | Romatier et al. | |
| 10,328,408 | B2 | 6/2019 | Victor et al. | |
| 2002/0123864 | A1 | 9/2002 | Eryurek et al. | 702/188 |
| 2002/0179495 | A1 | 12/2002 | Heyse et al. | 208/137 |
| 2003/0036052 | A1 | 2/2003 | Delwiche et al. | 435/4 |
| 2003/0105775 | A1 | 6/2003 | Shimada | |
| 2003/0147351 | A1 | 8/2003 | Greenlee | 370/232 |
| 2003/0223918 | A1 | 12/2003 | Cammy | 422/144 |
| 2004/0079392 | A1 | 4/2004 | Kuechler | 134/22.19 |
| 2004/0099572 | A1 | 5/2004 | Evans | 208/113 |
| 2004/0109788 | A1 | 6/2004 | Li et al. | 422/3 |
| 2004/0122273 | A1 | 6/2004 | Kabin | 585/639 |
| 2004/0122936 | A1 | 6/2004 | Mizelle et al. | |
| 2004/0147036 | A1 | 7/2004 | Krenn et al. | 436/119 |
| 2004/0148144 | A1 | 7/2004 | Martin | |
| 2004/0204775 | A1 | 10/2004 | Keyes | 705/30 |
| 2004/0204913 | A1 | 10/2004 | Mueller et al. | |
| 2004/0220689 | A1 | 11/2004 | Mathur et al. | 700/97 |
| 2004/0220778 | A1 | 11/2004 | Imai et al. | 702/188 |
| 2005/0027721 | A1 | 2/2005 | Saenz | 707/100 |
| 2005/0029163 | A1 | 2/2005 | Letzsch | 208/113 |
| 2005/0098033 | A1 | 5/2005 | Mallavarapu et al. | 95/96 |
| 2005/0133211 | A1 | 6/2005 | Osborn et al. | |
| 2005/0216209 | A1 | 9/2005 | Evans | 702/45 |
| 2006/0020423 | A1 | 1/2006 | Sharpe, Jr. | 702/183 |
| 2006/0133412 | A1 | 6/2006 | Callaghan | 370/465 |
| 2006/0252642 | A1 | 11/2006 | Kanazirev | |
| 2006/0259163 | A1 | 11/2006 | Hsiung et al. | 700/30 |
| 2007/0020154 | A1 | 1/2007 | Evans | 422/139 |
| 2007/0059159 | A1 | 3/2007 | Hjerpe | 415/117 |
| 2007/0059838 | A1 | 3/2007 | Morrison et al. | 436/55 |
| 2007/0091824 | A1 | 4/2007 | Budampati et al. | 370/255 |
| 2007/0091825 | A1 | 4/2007 | Budampati et al. | 370/255 |
| 2007/0185664 | A1 | 8/2007 | Tanaka | 702/56 |
| 2007/0192078 | A1 | 8/2007 | Nasle et al. | 703/14 |
| 2007/0212790 | A1 | 9/2007 | Welch et al. | 436/139 |

(56) References Cited

U.S. PATENT DOCUMENTS

| | | | |
|---|---|---|---|
| 2007/0250292 A1 | 10/2007 | Alagappan et al. | 702/184 |
| 2007/0260656 A1 | 11/2007 | Wiig | |
| 2007/0271452 A1 | 11/2007 | Foo Kune et al. | 713/150 |
| 2008/0086322 A1 | 4/2008 | Wallace | 705/1 |
| 2008/0130902 A1 | 6/2008 | Foo Kune et al. | 380/286 |
| 2008/0154434 A1* | 6/2008 | Galloway | G01N 33/005 700/271 |
| 2008/0217005 A1 | 9/2008 | Stluka et al. | 166/250.01 |
| 2008/0282606 A1 | 11/2008 | Plaza et al. | |
| 2009/0059786 A1 | 3/2009 | Budampati et al. | 370/230 |
| 2009/0060192 A1 | 3/2009 | Budampati et al. | 380/270 |
| 2009/0064295 A1 | 3/2009 | Budampati et al. | 726/6 |
| 2009/0201899 A1 | 8/2009 | Liu et al. | 370/338 |
| 2009/0204245 A1 | 8/2009 | Sustaeta | 700/99 |
| 2009/0245286 A1 | 10/2009 | Kore et al. | 370/475 |
| 2009/0259323 A1* | 10/2009 | Kesavan | B01D 53/047 700/44 |
| 2009/0268674 A1 | 10/2009 | Liu et al. | 370/329 |
| 2009/0281677 A1 | 11/2009 | Botich | 700/295 |
| 2010/0014599 A1 | 1/2010 | Holm et al. | 375/260 |
| 2010/0108567 A1 | 5/2010 | Medoff | 208/49 |
| 2010/0125347 A1 | 5/2010 | Martin et al. | 700/31 |
| 2010/0152900 A1 | 6/2010 | Gurciullo et al. | |
| 2010/0158764 A1 | 6/2010 | Hedrick | 422/134 |
| 2010/0230324 A1 | 9/2010 | Al-Alloush et al. | 208/82 |
| 2010/0262900 A1 | 10/2010 | Romatier et al. | 715/219 |
| 2011/0112659 A1 | 5/2011 | Pachner et al. | 700/29 |
| 2011/0152590 A1 | 6/2011 | Sadler et al. | 585/313 |
| 2011/0152591 A1 | 6/2011 | Sadler et al. | 585/313 |
| 2011/0311014 A1 | 12/2011 | Hottovy et al. | 376/283 |
| 2012/0029966 A1 | 2/2012 | Cheewakriengkrai et al. | 705/7.25 |
| 2012/0083933 A1 | 4/2012 | Subbu et al. | 700/291 |
| 2012/0095808 A1 | 4/2012 | Kattapuram et al. | 705/7.37 |
| 2012/0104295 A1 | 5/2012 | Do et al. | 251/129.01 |
| 2012/0121376 A1 | 5/2012 | Huis in Het Veld | 415/1 |
| 2012/0123583 A1 | 5/2012 | Hazen et al. | |
| 2012/0197616 A1 | 8/2012 | Trnka | 703/6 |
| 2012/0259583 A1 | 10/2012 | Noboa et al. | |
| 2013/0029587 A1 | 1/2013 | Gandhi et al. | 455/7 |
| 2013/0031960 A1 | 2/2013 | Delrahim | 73/40.5 R |
| 2013/0079899 A1 | 3/2013 | Baramov | 700/32 |
| 2013/0090088 A1 | 4/2013 | Chevsky et al. | 455/411 |
| 2013/0094422 A1 | 4/2013 | Thanikachalam | 370/312 |
| 2013/0172643 A1 | 7/2013 | Pradeep | 585/310 |
| 2013/0253898 A1 | 9/2013 | Meagher et al. | 703/18 |
| 2013/0270157 A1 | 10/2013 | Ferrara | 208/48 AA |
| 2013/0311437 A1 | 11/2013 | Stluka et al. | 707/706 |
| 2013/0327052 A1 | 12/2013 | O'Neill | 60/772 |
| 2014/0008035 A1 | 1/2014 | Patankar et al. | |
| 2014/0026598 A1 | 1/2014 | Trawicki | 62/56 |
| 2014/0074273 A1 | 3/2014 | Mohideen et al. | 700/98 |
| 2014/0114039 A1 | 4/2014 | Benham et al. | 526/348.5 |
| 2014/0131027 A1 | 5/2014 | Chir | 165/300 |
| 2014/0163275 A1 | 6/2014 | Yanagawa et al. | 585/319 |
| 2014/0179968 A1 | 6/2014 | Yanagawa et al. | 585/476 |
| 2014/0212978 A1 | 7/2014 | Sharpe, Jr. et al. | 436/6 |
| 2014/0294683 A1 | 10/2014 | Siedler | 422/129 |
| 2014/0294684 A1 | 10/2014 | Siedler | 422/129 |
| 2014/0296058 A1 | 10/2014 | Sechrist et al. | 502/53 |
| 2014/0309756 A1 | 10/2014 | Trygstad | 700/31 |
| 2014/0337256 A1 | 11/2014 | Varadi et al. | 706/12 |
| 2014/0337277 A1 | 11/2014 | Asenjo et al. | |
| 2015/0059714 A1 | 3/2015 | Bernards | 123/568.11 |
| 2015/0060331 A1 | 3/2015 | Sechrist et al. | |
| 2015/0077263 A1 | 3/2015 | Ali et al. | 340/679 |
| 2015/0078970 A1 | 3/2015 | Iddir et al. | 422/218 |
| 2015/0098862 A1 | 4/2015 | Lok et al. | 422/49 |
| 2015/0158780 A1 | 6/2015 | Keusenkothen | 60/780 |
| 2015/0185716 A1 | 7/2015 | Wichmann et al. | 700/287 |
| 2015/0276208 A1 | 10/2015 | Maturana et al. | 700/274 |
| 2015/0284641 A1 | 10/2015 | Shi | 208/113 |
| 2015/0330571 A1 | 11/2015 | Beuneken | 141/4 |
| 2016/0033941 A1 | 2/2016 | T et al. | 700/81 |
| 2016/0048119 A1 | 2/2016 | Wojsznis | 700/11 |
| 2016/0098037 A1 | 4/2016 | Zornio et al. | 700/20 |
| 2016/0098234 A1 | 4/2016 | Weaver | 358/1.15 |
| 2016/0122663 A1 | 5/2016 | Pintart et al. | |
| 2016/0147204 A1 | 5/2016 | Wichmann et al. | 700/287 |
| 2016/0214056 A1* | 7/2016 | Fredenhagen | B01D 53/06 |
| 2016/0237910 A1 | 8/2016 | Saito | |
| 2016/0260041 A1 | 9/2016 | Horn et al. | |
| 2016/0291584 A1 | 10/2016 | Horn et al. | |
| 2016/0292188 A1 | 10/2016 | Horn et al. | |
| 2016/0292325 A1 | 10/2016 | Horn et al. | |
| 2016/0313653 A1 | 10/2016 | Mink | |
| 2016/0363315 A1 | 12/2016 | Colannino et al. | |
| 2017/0009932 A1 | 1/2017 | Oh | |
| 2017/0058213 A1 | 3/2017 | Oprins | 585/303 |
| 2017/0082320 A1 | 3/2017 | Wang | |
| 2017/0107188 A1 | 4/2017 | Kawaguchi | |
| 2017/0284410 A1 | 10/2017 | Sharpe, Jr. | |
| 2017/0315543 A1 | 11/2017 | Horn et al. | |
| 2017/0323038 A1 | 11/2017 | Horn et al. | |
| 2017/0352899 A1 | 12/2017 | Asai | |
| 2018/0046155 A1 | 2/2018 | Horn et al. | |
| 2018/0081344 A1 | 3/2018 | Romatier et al. | |
| 2018/0082569 A1 | 3/2018 | Horn et al. | |
| 2018/0121581 A1 | 5/2018 | Horn et al. | |
| 2018/0122021 A1 | 5/2018 | Horn et al. | |
| 2018/0155638 A1 | 6/2018 | Al-Ghamdi | 208/79 |
| 2018/0155642 A1 | 6/2018 | Al-Ghamdi et al. | |
| 2018/0197350 A1 | 7/2018 | Kim | |
| 2018/0275690 A1 | 9/2018 | Lattanzio et al. | |
| 2018/0275691 A1 | 9/2018 | Lattanzio et al. | |
| 2018/0275692 A1 | 9/2018 | Lattanzio et al. | |
| 2018/0280914 A1 | 10/2018 | Victor et al. | |
| 2018/0280917 A1 | 10/2018 | Victor et al. | |
| 2018/0282633 A1 | 10/2018 | Van de Cotte et al. | |
| 2018/0282634 A1 | 10/2018 | Van de Cotte et al. | |
| 2018/0282635 A1 | 10/2018 | Van de Cotte et al. | |
| 2018/0283368 A1 | 10/2018 | Van de Cotte et al. | |
| 2018/0283392 A1 | 10/2018 | Van de Cotte et al. | |
| 2018/0283404 A1 | 10/2018 | Van de Cotte et al. | |
| 2018/0283811 A1 | 10/2018 | Victor et al. | |
| 2018/0283812 A1 | 10/2018 | Victor et al. | |
| 2018/0283813 A1 | 10/2018 | Victor et al. | |
| 2018/0283815 A1 | 10/2018 | Victor et al. | |
| 2018/0283816 A1 | 10/2018 | Victor et al. | |
| 2018/0283818 A1 | 10/2018 | Victor et al. | |
| 2018/0284705 A1 | 10/2018 | Van de Cotte et al. | |
| 2018/0286141 A1 | 10/2018 | Van de Cotte et al. | |
| 2018/0311609 A1 | 11/2018 | McCool et al. | |
| 2018/0362862 A1 | 12/2018 | Gellaboina et al. | |
| 2018/0363914 A1 | 12/2018 | Faiella et al. | |
| 2018/0364747 A1 | 12/2018 | Charr et al. | |
| 2019/0002318 A1 | 1/2019 | Thakkar et al. | |
| 2019/0003978 A1 | 1/2019 | Shi et al. | |
| 2019/0015806 A1 | 1/2019 | Gellaboina et al. | |
| 2019/0041813 A1 | 2/2019 | Horn et al. | |
| 2019/0083920 A1* | 3/2019 | Bjorklund | B01D 53/053 |
| 2019/0101336 A1 | 4/2019 | Victor et al. | |
| 2019/0101342 A1 | 4/2019 | Victor et al. | |
| 2019/0101907 A1 | 4/2019 | Charr et al. | |
| 2019/0102966 A1 | 4/2019 | Lorenz | |
| 2019/0108454 A1 | 4/2019 | Banerjee et al. | |
| 2019/0120810 A1 | 4/2019 | Kumar et al. | |
| 2019/0151814 A1 | 5/2019 | Victor et al. | |
| 2019/0155259 A1 | 5/2019 | Romatier et al. | |

FOREIGN PATENT DOCUMENTS

| | | | | |
|---|---|---|---|---|
| EP | | 2801937 A1 | 11/2014 | G06Q 10/06 |
| GB | | 1134439 A | 11/1968 | G01N 31/22 |
| WO | WO 1990/010083 A1 | | 9/1990 | C12Q 1/04 |
| WO | WO 2001/060951 A1 | | 8/2001 | C10G 51/04 |
| WO | WO 2006/044408 A1 | | 4/2006 | F23D 14/72 |
| WO | WO 2007/095585 A2 | | 8/2007 | A61K 31/721 |
| WO | WO 2009/046095 A1 | | 4/2009 | G06F 11/00 |
| WO | WO 2014/042508 A1 | | 3/2014 | G06Q 50/04 |
| WO | WO 2014/123993 A1 | | 8/2014 | G06F 17/00 |

(56) References Cited

FOREIGN PATENT DOCUMENTS

WO   WO 2016/141128 A1   9/2016   ............ G06Q 10/06
WO   WO 2017/079058 A1   5/2017   ............ B01D 1/14

OTHER PUBLICATIONS

U.S. Appl. No. 15/640,120, filed Mar. 30, 2015, Ian G. Horn Zak Alzein Paul Kowalczyk Christophe Romatier Evaluating Petrochemical Plant Errors to Determine Equipment Changes for Optimized Operations.
U.S. Appl. No. 15/851,207, filed Mar. 27, 2017, Louis A. Lattanzio Alex Green Ian G. Horn Matthew R. Wojtowicz, Operating Slide Valves in Petrochemical Plants or Refineries.
U.S. Appl. No. 15/851,343, filed Dec. 21, 2017, Louis A. Lattanzio Alex Green Ian G. Horn Matthew R. Wojtowicz, Early Prediction and Detection of Slide Valve Sticking in Petrochemical Plants or Refineries.
U.S. Appl. No. 15/851,360, filed Mar. 27, 2017, Louis A. Lattanzio Alex Green Ian G. Horn Matthew R. Wojtowicz, Measuring and Determining Hot Spots in Slide Valves for Petrochemical Plants or Refineries.
U.S. Appl. No. 15/853,689, filed Mar. 30, 2015, Ian G. Horn Zak Alzein Paul Kowalczyk Christophe Romatier, Cleansing System for a Feed Composition Based on Environmental Factors.
U.S. Appl. No. 15/858,767, filed Dec. 28, 2017, Ian G. Horn Zak Alzein Paul Kowalczyk Christophe Romatier, Chemical Refinery Performance Optimization.
U.S. Appl. No. 15/899,967, filed Feb. 20, 2018, Joel Kaye, Developing Linear Process Models Using Reactor Kinetic Equations.
U.S. Appl. No. 15/935,827, filed Mar. 28, 2017, Michael R. Van de Cotte Ian G. Horn, Rotating Equipment in a Petrochemical Plant or Refinery.
U.S. Appl. No. 15/935,847, filed Mar. 28, 2017, Michael R. Van de Cotte Ian G. Horn, Rotating Equipment in a Petrochemical Plant or Refinery.
U.S. Appl. No. 15/935,872, filed Mar. 28, 2017, Michael R. Van de Cotte Ian G. Horn, Early Surge Detection of Rotating Equipment in a Petrochemical Plant or Refinery.
U.S. Appl. No. 15/935,898, filed Mar. 28, 2017, Michael R. Van de Cotte Ian G. Horn, Reactor Loop Fouling Monitor for Rotating Equipment in a Petrochemical Plant or Refinery.
U.S. Appl. No. 15/935,920, filed Mar. 28, 2017, Michael R. Van de Cotte Ian G. Horn, Sensor Location for Rotating Equipment in a Petrochemical Plant or Refinery.
U.S. Appl. No. 15/935,935, filed Mar. 28, 2017, Michael R. Van de Cotte Ian G. Horn, Determining Quality of Gas for Rotating Equipment in a Petrochemical Plant or Refinery.
U.S. Appl. No. 15/935,950, filed Mar. 28, 2017, Michael R. Van de Cotte Ian G. Horn, Determining Quality of Gas for Rotating Equipment in a Petrochemical Plant or Refinery.
U.S. Appl. No. 15/935,957, filed Mar. 28, 2017, Michael R. Van de Cotte Ian G. Horn, Using Molecular Weight and Invariant Mapping to Determine Performance of Rotating Equipment in a Petrochemical Plant or Refinery.
U.S. Appl. No. 15/937,484, filed Mar. 28, 2017, Sanford A. Victor Phillip F. Daly Ian G. Horn, Detecting and Correcting Maldistribution in Heat Exchangers in a Petrochemical Plant or Refinery.
U.S. Appl. No. 15/937,499, filed Mar. 28, 2017, Sanford A. Victor Phillip F. Daly Ian G. Horn, Detecting and Correcting Cross-Leakage in Heat Exchangers in a Petrochemical Plant or Refinery.
U.S. Appl. No. 15/937,517, filed Mar. 28, 2017, Sanford A. Victor Phillip F. Daly Ian G. Horn, Strain Gauges and Detecting Pre-Leakage in Heat Exchangers in a Petrochemical Plant or Refinery.
U.S. Appl. No. 15/937,535, filed Mar. 28, 2017, Sanford A. Victor Phillip F. Daly Ian G. Horn, Detecting and Correcting Thermal Stresses in Heat Exchangers in a Petrochemical Plant or Refinery.
U.S. Appl. No. 15/937,588, filed Mar. 28, 2017, Sanford A. Victor Phillip F. Daly Ian G. Horn, Detecting and Correcting Problems in Liquid Lifting in Heat Exchangers.
U.S. Appl. No. 15/937,602, filed Mar. 28, 2017, Sanford A. Victor Phillip F. Daly Ian G. Horn, Air-Cooled Heat Exchangers.
U.S. Appl. No. 15/937,614, filed Mar. 28, 2017, Sanford A. Victor Phillip F. Daly Ian G. Horn, Wet-Cooled Heat Exchanger.
U.S. Appl. No. 15/937,624, filed Mar. 28, 2017, Sanford A. Victor Phillip F. Daly Ian G. Horn, Heat Exchangers in a Petrochemical Plant or Refinery.
U.S. Appl. No. 15/963,840, filed Apr. 28, 2017, Ryan McCool Chad E. Bjorklund Jorge Charr Luk Verhulst, Remote Monitoring of Adsorber Process Units.
U.S. Appl. No. 15/972,974, filed Jun. 20, 2017, Jorge Charr Kevin Carnes Ralph Davis Donald A. Eizenga Christina L. Haasser James W. Harris Raul A. Ohaco Daliah Papoutsis, Incipient Temperature Excursion Mitigation and Control.
U.S. Appl. No. 15/979,421, filed May 14, 2018, Mahesh K. Gellaboina Louis A. Lattanzio, Catalyst Transfer Pipe Plug Detection.
U.S. Appl. No. 16/007,669, filed Jun. 28, 2017, Yili Shi Daliah Papoutsis Jonathan Andrew Tertel, Process and Apparatus to Detect Mercaptans in a Caustic Stream.
U.S. Appl. No. 16/011,600, filed Jun. 19, 2017, Theodore Peter Faiella Colin J. Deller Raul A. Ohaco, Remote Monitoring of Fired Heaters.
U.S. Appl. No. 16/011,614, filed Jun. 19, 2017, Mahesh K. Gellaboina Michael Terry Seth Huber Danielle Schindlbeck, Catalyst Cycle Length Prediction Using Eigen Analysis.
U.S. Appl. No. 16/015,579, filed Jun. 28, 2017, Killol H. Thakkar Robert W. Brafford Eric C. Tompkins, Process and Apparatus for Dosing Nutrients to a Bioreactor.
U.S. Appl. No. 16/133,623, filed Sep. 18, 2017, Chad E. Bjorklund Jeffrey Guenther Stephen Kelley Ryan McCool, Remote Monitoring of Pressure Swing Adsorption Units.
U.S. Appl. No. 16/140,770, filed Oct. 20, 2017, Dinesh Kumar KN Soumendra Mohan Banerjee, System and Method to Optimize Crude Oil Distillation or Other Processing by Inline Analysis of Crude Oil Properties.
U.S. Appl. No. 16/148,763, filed Oct. 2, 2017, Jorge Chan Bryan J. Egolf Dean E. Rende Mary Wier Guy B. Woodie Carol Zhu, Remote Monitoring of Chloride Treaters Using a Process Simulator Based Chloride Distribution Estimate.
U.S. Appl. No. 16/151,086, filed Oct. 5, 2017, Soumendra Mohan Banerjee Deepak Bisht Priyesh Jayendrakumar Jani Krishna Mani Gautam Pandey, Harnessing Machine Learning & Data Analytics for a Real Time Predictive Model for a Fcc Pre-Treatment Unit.
U.S. Appl. No. 16/154,138, filed Oct. 8, 2018, Raul A. Ohaco Jorge Charr, High Purity Distillation Process Control With Multivatiable and Model Predictive Control (Mpc) and Fast Response Analyzer.
U.S. Appl. No. 16/154,141, filed Oct. 8, 2018, Ian G. Horn Zak Alzein Paul Kowalczyk Christophe Romatier, System and Method for Improving Performance of a Plant With a Furnace.
U.S. Appl. No. 16/215,101, filed Dec. 10, 2018, Louis A. Lattanzio Christopher Schindlbeck, Delta Temperature Control of Catalytic Dehydrogenation Process Reactors.
U.S. Appl. No. 16/252,021, filed Sep. 16, 2016, Christophe Romatier Zak Alzein Ian G. Horn Paul Kowalczyk David Rondeau, Petrochemical Plant Diagnostic System and Method for Chemical Process Model Analysis.
U.S. Appl. No. 16/253,181, filed Mar. 28, 2017 Ian G. Horn Phillip F. Daly Sanford A. Victor, Detecting and Correcting Vibration in Heat Exchangers.
U.S. Appl. No. 16/363,406, filed Mar. 30, 2018, Louis A. Lattanzio Abhishek Pednekar, Catalytic Dehydrogenation Reactor Performance Index.
Bespalov A. V. et al., Control systems of chemical and technological processes, pp. 508-509 (2001) (Russian).
Daniel Goebel, Dry Gas Seal Contamination During Operation and Pressurization Hold, [online], Feb. 2016, [retrieved on Jun. 19, 2019]. Retrieved from <https://core.ac.uk/download/pdf/84815277.pdf> (Year: 2016).
EnergyMEDOR®, Product brochure (Nov. 2014).
Chistof Huber, Density and Concentration Measurement Application for Novel MEMS-based Micro Densitometer for Gas, [online], 2016, [retrieved on Jun. 19, 2019]. Retrieved from <https://www.ama-science.org/proceedings/getFile/ZwZ1 BD==> (Year: 2016).

(56) References Cited

OTHER PUBLICATIONS

Lotters, Real-time Composition Determination of Gas Mixtures, [online], 2015, [retrieved on Jun. 19, 2019]. Retrieved from <https://www.ama-science.org/proceedings/getFile/ZwNOZj==> (Year: 2015).
Maybeck, Peter S., "Stochastic models, estimation, and control," vol. 1, Academic Press (1979), 19 pages.

* cited by examiner

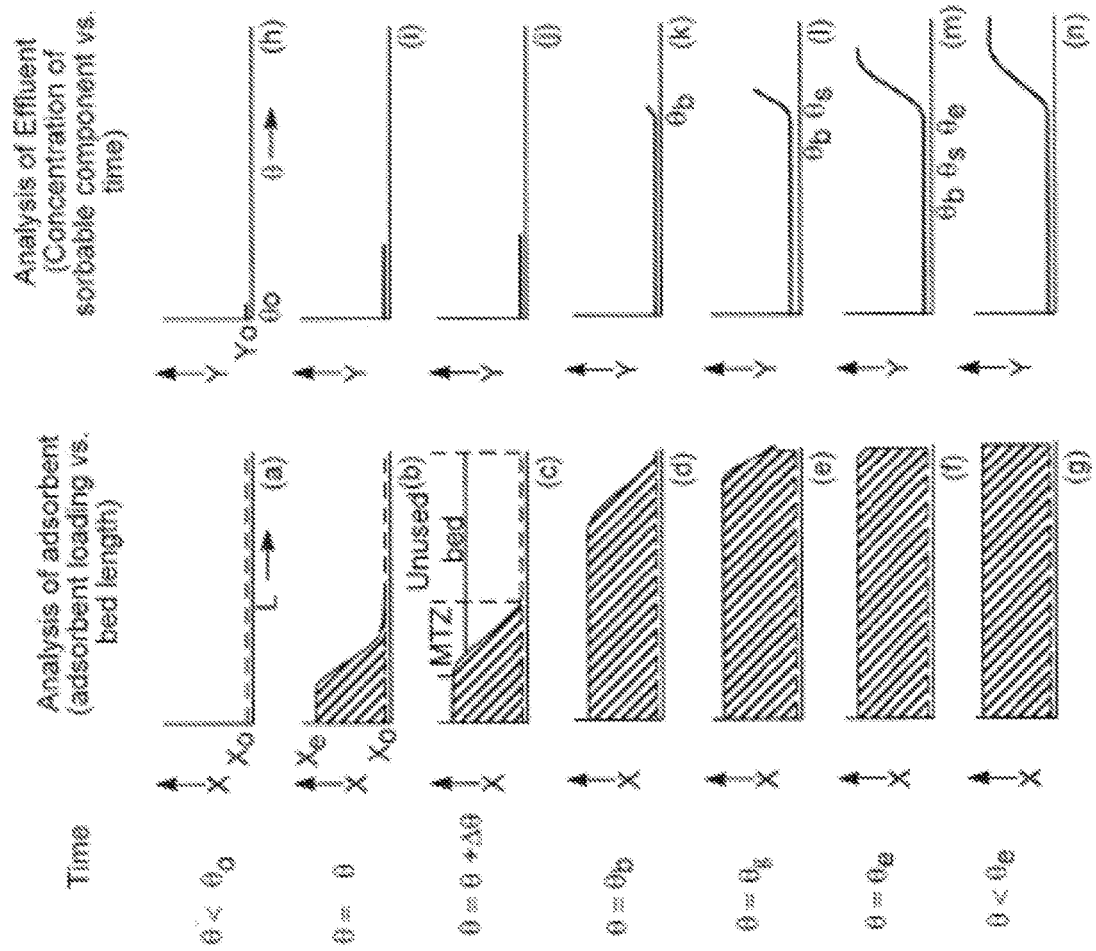
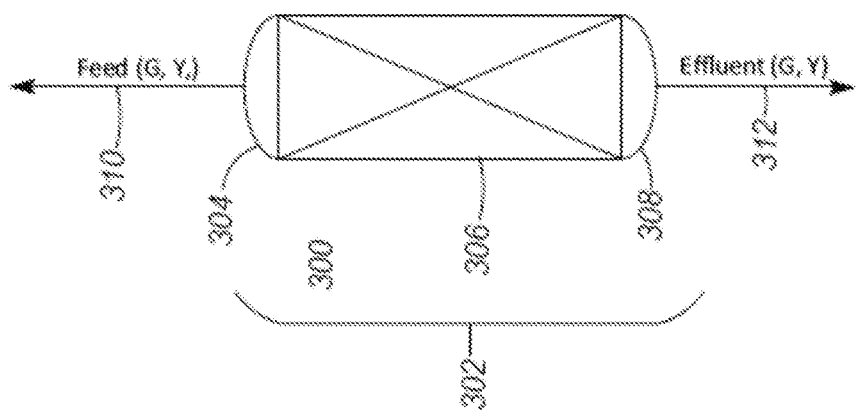
FIG. 3B
FIG. 3A

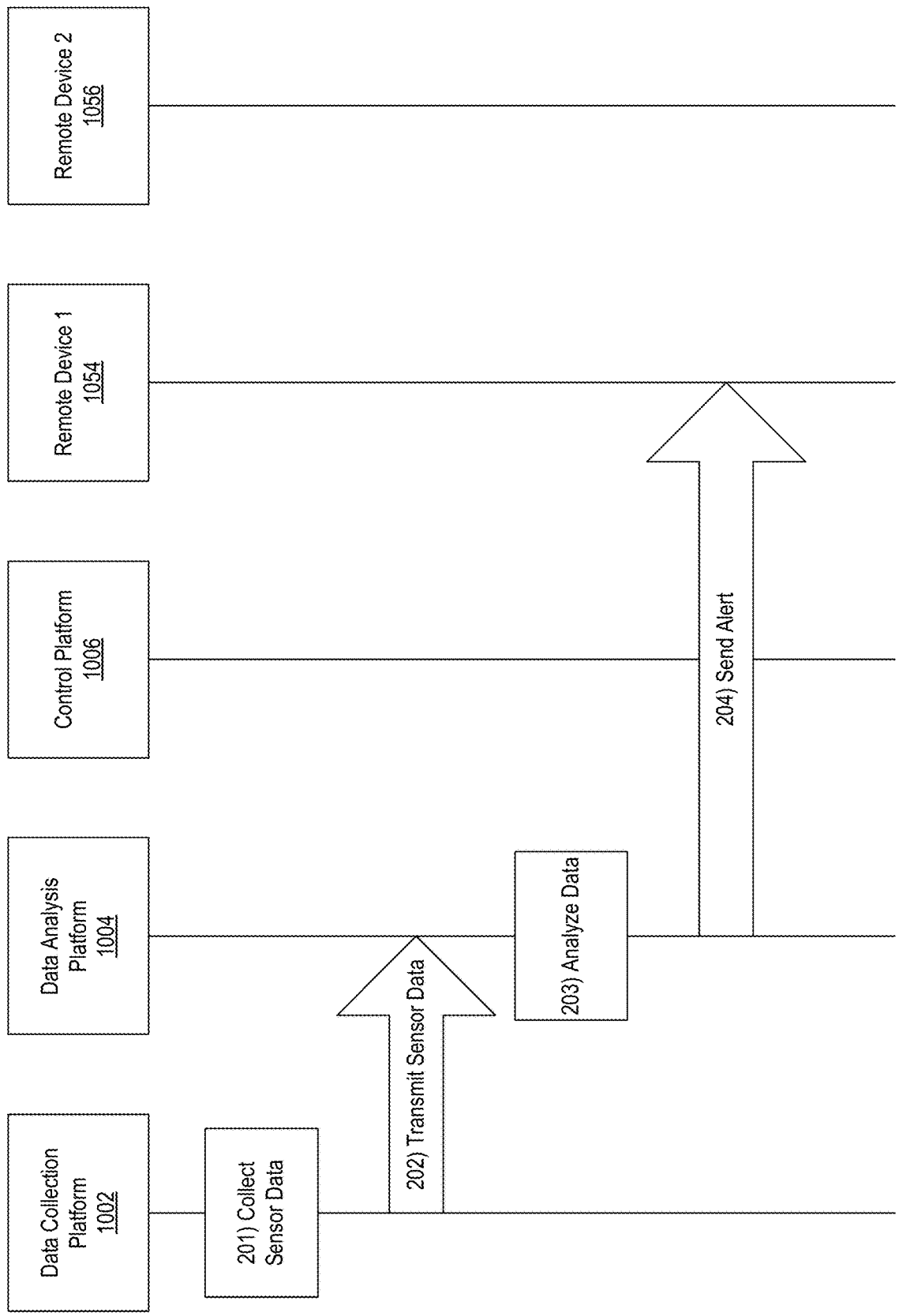

REMOTE MONITORING OF ADSORBER PROCESS UNITS

CROSS-REFERENCE TO RELATED APPLICATION

This application claims the benefit of priority under 35 U.S.C. § 119(e) to U.S. Provisional Application No. 62/491,785, filed Apr. 28, 2017, which is incorporated by reference in its entirety.

FIELD

The disclosure relates generally to a method and system for managing the operation of a plant, such as a chemical plant or a petrochemical plant or a refinery, and more particularly to a method for improving the performance of components that make up operations in a plant. Typical plants may be those that provide natural gas processors or other process units.

BACKGROUND

A plant or refinery may include one or more adsorbers, which may be subject to various problems. Equipment may break down over time, and need to be repaired or replaced. Additionally, a process may be more or less efficient depending on one or more operating characteristics. There will always be a need for improving process efficiencies and improving equipment reliability.

SUMMARY

The following summary presents a simplified summary of certain features. The summary is not an extensive overview and is not intended to identify key or critical elements.

One or more embodiments may include a system comprising a plant comprising an adsorber process unit; one or more sensors configured to measure operating information for the adsorber process unit; a data collection platform; a data analysis platform; and/or a control platform. The data collection platform may include one or more processors of the data collection platform; a communication interface of the data collection platform and in communication with the one or more sensors; and non-transitory computer-readable memory storing executable instructions that, when executed, cause the data collection platform to: receive sensor data comprising the operating information for the adsorber process unit; correlate the sensor data with metadata comprising time data; and transmit the sensor data to a data analysis platform. The data analysis platform may include one or more processors of the data analysis platform; non-transitory computer-readable memory storing executable instructions that, when executed, cause the data analysis platform to: receive the sensor data from the data collection platform; analyze the sensor data; and based on the analyzed sensor data, transmit a command for an adjustment to an operating condition related to the adsorber process unit. The control platform may include one or more processors of the control platform; non-transitory computer-readable memory storing executable instructions that, when executed, cause the control platform to: receive the command for the adjustment to the operating condition related to the adsorber process unit; and adjust the operating condition related to the adsorber process unit.

One or more embodiments may include a method comprising: receiving, by a data analysis computing device, sensor data for a sensor associated with an adsorber process unit; based on analyzing the sensor data, determining, by the data analysis computing device, an ideal operating condition for an element of the adsorber process unit; determining, by the data analysis computing device, a difference between a most recent operating condition for the element of the adsorber process unit and the ideal operating condition for the element of the adsorber process unit; based on the analyzed sensor data, determining, by the data analysis computing device, a command for adjusting the element of the adsorber process unit to reduce the difference between the most recent operating condition and the ideal operating condition; and sending, by the data analysis computing device, the command for adjusting the element of the adsorber process unit.

One or more embodiments may include non-transitory computer-readable media storing executable instructions that, when executed by one or more processors, cause a system to: receive sensor data for a sensor associated with an adsorber process unit; based on analyzing the sensor data, determine an ideal operating condition for an element of the adsorber process unit; determine a difference between a most recent operating condition for the element of the adsorber process unit and the ideal operating condition for the element of the adsorber process unit; based on the analyzed sensor data, determine a command for adjusting the element of the adsorber process unit to reduce the difference between the most recent operating condition and the ideal operating condition; and send the command for adjusting the element of the adsorber process unit.

Other technical features may be readily apparent to one skilled in the art from the following figures, descriptions, and claims.

BRIEF DESCRIPTION OF DRAWINGS

The present disclosure is illustrated by way of example and not limited in the accompanying figures in which like reference numerals indicate similar elements and in which:

FIG. 3A depicts the flow through an adsorber bed in accordance with one or more example embodiments.

FIG. 3B depicts an analysis of adsorbent and analysis of effluent through the adsorber bed of FIG. 3A in accordance with one or more example embodiments;

FIGS. 6A-6B depict an illustrative flow diagram of one or more steps that one or more devices may perform in controlling one or more aspects of a plant operation in accordance with one or more example embodiments.

DETAILED DESCRIPTION

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

A natural gas processing plant is a facility designed to remove impurities and non-methane hydrocarbons and fluids from raw natural gas to produce dry natural gas. A gas processing plant is also used to recover natural gas liquids and other substances such as sulfur. Natural gas processing separates the various hydrocarbons (ethane, propane, butane, and pentanes) and fluids from the pure natural gas (methane), to produce what is known as 'pipeline quality' dry natural gas.

Figure 1:
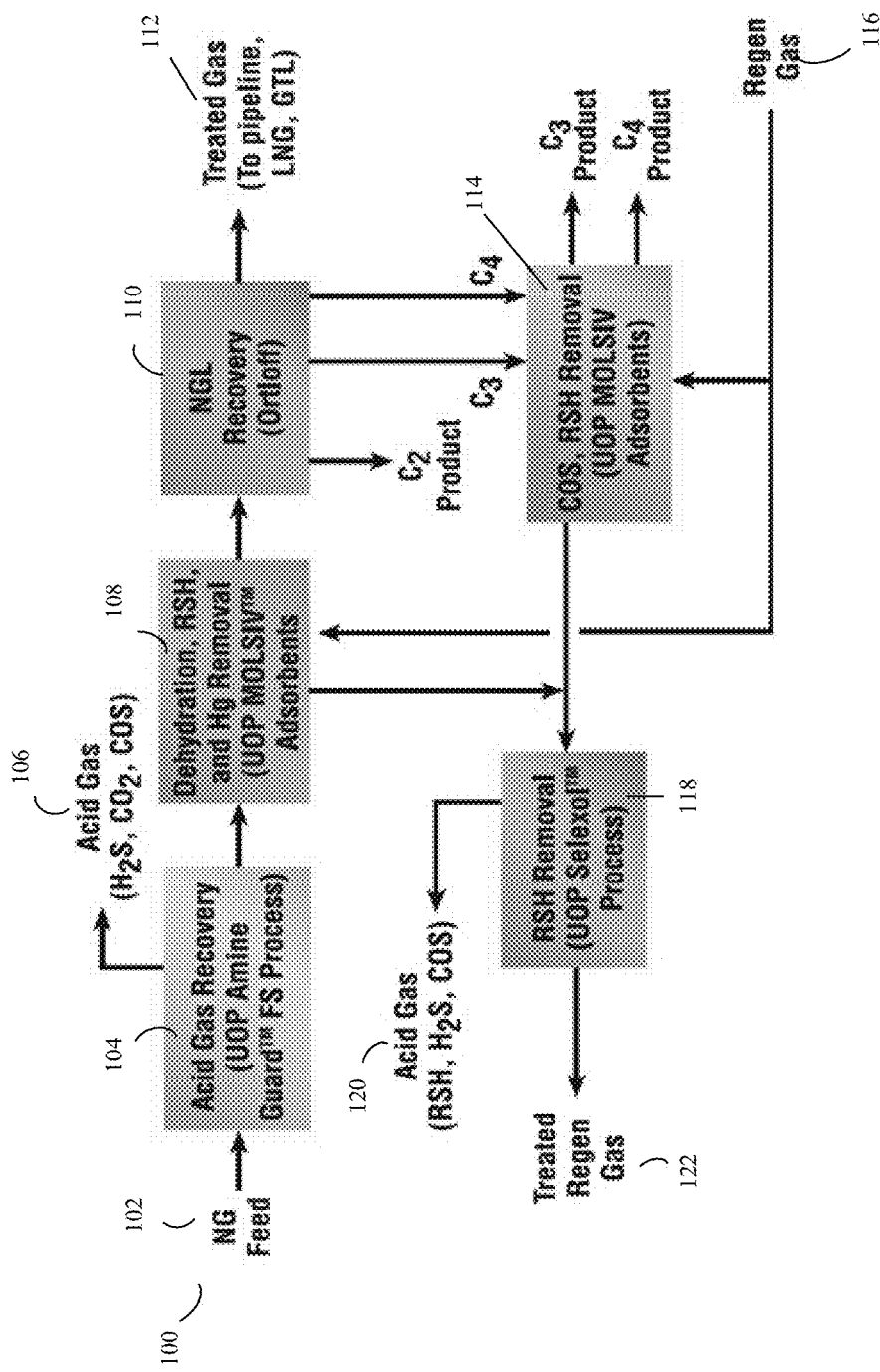
FIG. 1 depicts an illustrative arrangement for a natural gas process in accordance with one or more example embodiments.

A non-limiting example gas-treating process 100 is shown in FIG. 1. A raw feed gas 102 is fed into an amine acid gas removal unit 104 to remove acid gas 106, for example to remove $H_2S$, $CO_2$, and COS. Water, mercaptan sulfur (RSH), and mercury (Hg) are subsequently removed via a multi-adsorbent molecular sieve desulfurization unit 108. In the next step, the C1 through C5+ hydrocarbon fractions are then separated in NGL recovery unit 110 such as via a turbo expander and natural gas liquids ("NGL") fractionation. The treated gas continues on such as to pipeline 112. The C3 and C4 fractions are treated in a liquid-phase molecular sieve unit 114 to remove sulfur compounds such as COS and $H_2S$ (aka sulfur polishing). When the adsorbent beds are spent, regeneration gas 116 is supplied to the adsorbers to regenerate the adsorbent beds. The spent regeneration gas from the molecular sieve desulfurization unit is treated in a Selexol Unit 118 to remove acid gas (RSH, $H_2S$, and COS) from the regeneration gas. The acid gas stream 120 may be sent to a Claus sulfur recovery unit for conversion into elemental sulfur. The desulfurized regeneration gas 122 is either compressed and recycled back to the entry of the amine unit, and/or used as fuel for a gas turbine for facility power generation.

References herein to a "plant" are to be understood to refer to any of various types of chemical and petrochemical manufacturing or refining facilities. References herein to a plant "operators" are to be understood to refer to and/or include, without limitation, plant planners, managers, engineers, technicians, technical advisors, specialists (e.g., in instrumentation, pipe fitting, and welding), shift personnel, and others interested in, starting up, overseeing, monitoring operations of, and shutting down, the plant.

Adsorber

Adsorbers have many purposes in chemical, gas-processing, and petrochemical plants. There are many different types of adsorbers with the selection based on the specifics of its intended purpose. Adsorbers typically utilized in the natural gas industry include adsorbers for dehydration of the natural gas. Adsorbers may also be used to remove water ($H2O$) and/or sulfur components such as hydrogen sulfide ($H_2S$), mercaptan sulfur (RSH), and carbonyl sulfide (COS), and/or mercury (Hg) from the gas streams. For example, as seen in FIG. 1, adsorber 106 is used to dehydrate, and remove RSH and Hg from, the treated feed gas. Adsorber 114 is used to remove COS and RSH from the C3 and C4 product streams.

Adsorber vessels may be made of any material of construction used for gas-processing equipment. Such construction material may include carbon steel, stainless steel, low chrome carbon steels, mid chrome carbon steels, austenitic stainless steels, high alloys, copper alloys, nickel alloys and/or titanium. Adsorber vessels contain an adsorbent or combination of adsorbents suitable for the process.

Batch processes typically use fixed bed adsorption vessels. Continuous processes typically use multiple adsorbers operated in consecutive cycles of adsorption and regeneration. Ideally the adsorbers operate at or close to design process parameters for maximum performance and adsorbent service life.

The adsorbers operate in two cycles—The first cycle is an adsorption cycle where adsorbent is loaded into the adsorber vessel and impurities are removed from a process stream. The second cycle is a regeneration cycle where the adsorbent is heated and purged with a regeneration gas to remove the impurities from the adsorbent.

Figure 2A:
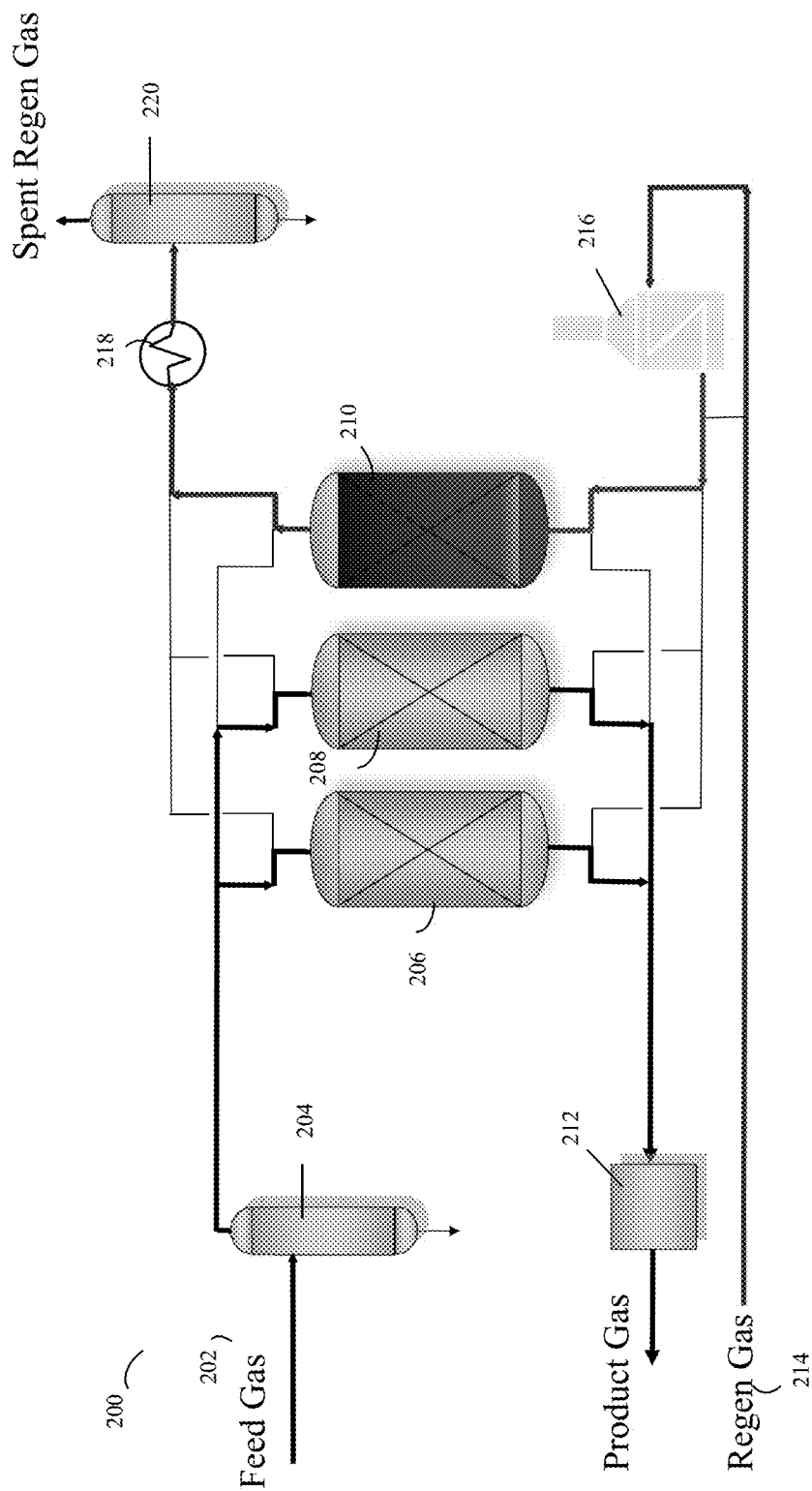
FIG. 2A depicts an illustrative adsorption process with regeneration gas flow heating accordance with one or more example embodiments.
Figure 2B:
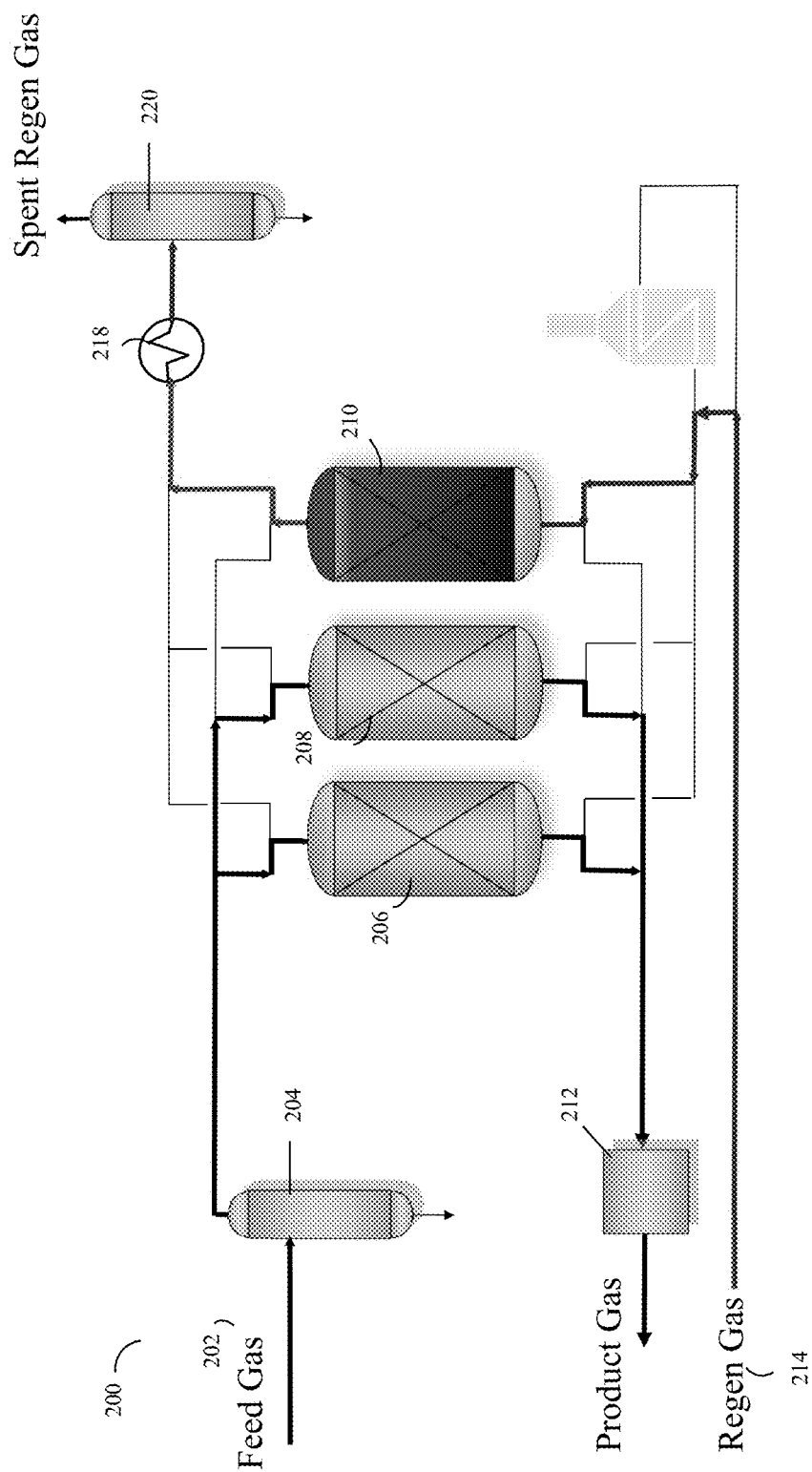
FIG. 2B depicts an illustrative adsorption process with regeneration gas flow cooling accordance with one or more example embodiments.
Figure 2C:
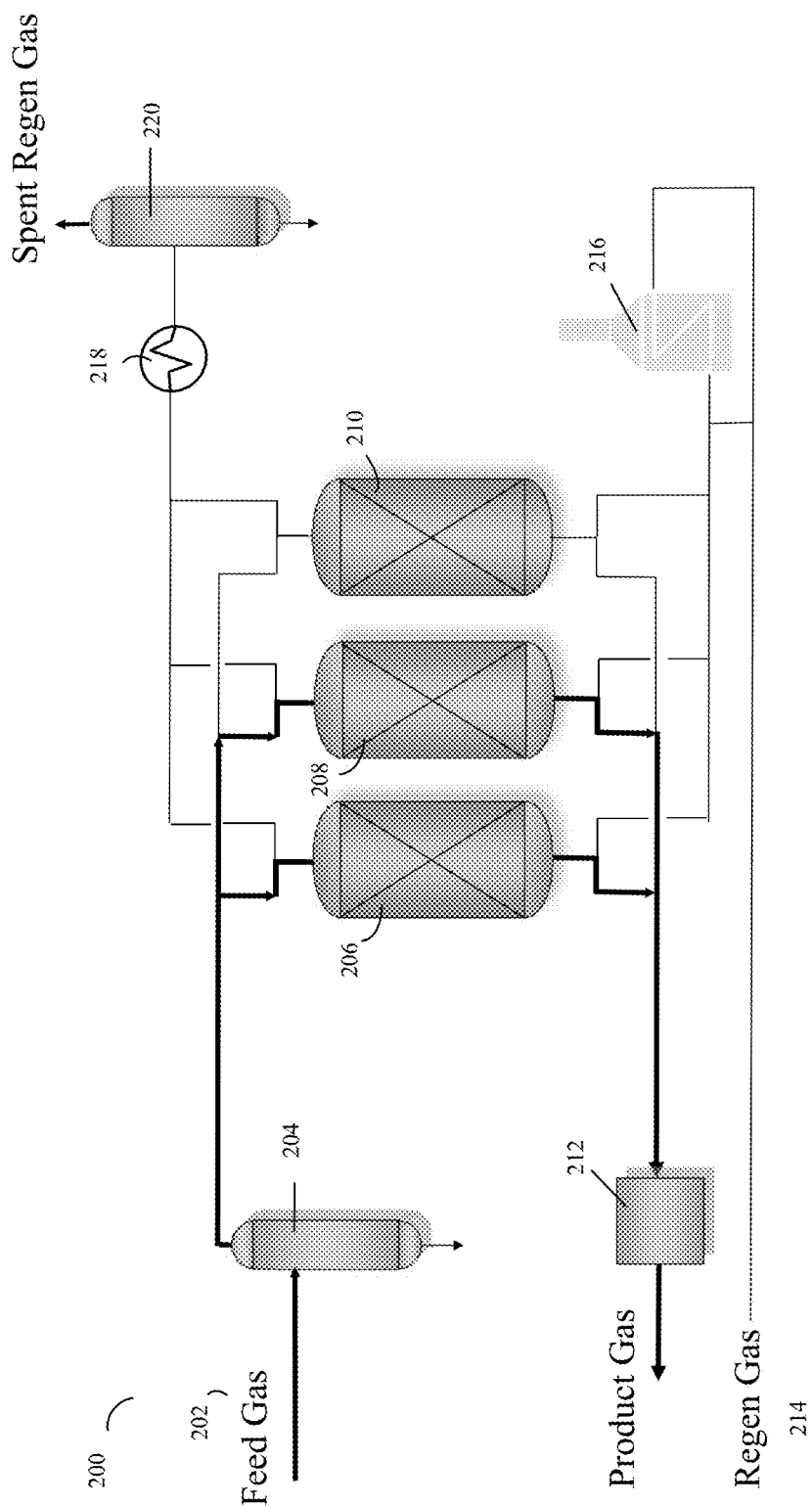
FIG. 2C depicts an illustrative adsorption process unit having an adsorption vessel in stand-by in accordance with one or more example embodiments.

FIGS. 2A-2C depict typical adsorption process units for gas processing. A feed gas 202 enters a feed gas separator (KO drum) 204 where the acid gases are separated from the feed gas. The separated feed gas is then fed to at least one of multiple parallel adsorber vessels 206, 208, 210. For example, in each of FIGS. 2A-2C, two of the adsorber vessels 206, 208, are operating to remove impurities from the feed gas. After adsorption, the product gas is filtered 212 and then transferred to NGL recovery such as shown in FIG. 1. In each of FIGS. 2A-2C, a third adsorber 210 is being regenerated or is in standby mode.

FIG. 2A is directed to the regeneration heating during the process of regeneration. Regeneration gas 214 is heated in a regeneration heater 216, and then transferred to the bottom or top of adsorber vessel 210. The gas is removed from the top or bottom of adsorber vessel 210, and then transferred to a regeneration gas separator 220 (knockout (KO) drum). The regeneration heater 216 may be a heat exchanger, for example a plate and frame heat exchanger.

FIG. 2B is directed to regeneration cooling during the process of regeneration. Regeneration gas 214 is transferred to the bottom or top of adsorber vessel (bypassing heater 216.) The gas is removed from the top or bottom of adsorber vessel 210, transferred through a regeneration gas cooler 218, and then transferred to a regeneration gas separator 220 (KO drum). The regeneration gas cooler 220 may be a cold box or air cooler, for example a plate and frame heat exchanger.

FIG. 2C is directed the third adsorber unit 210 after regeneration and being standby mode for when one of the other two adsorber units 206, 208 needs to be taken off line for regeneration.

FIG. 3A depicts an adsorber system 300 having an adsorber vessel 302 having a feed header 304, an adsorbent bed 306, and a product header 308. Feed gas 310 enters the top of the adsorber vessel 302 through header 304, passes through the adsorbent bed 306, and then effluent (dry gas) 312 exits the bottom of the adsorber. The gas. FIG. 3B provides an analysis of the adsorbent (adsorbent loading vs. bed length) over incremental time periods and an analysis of effluent (concentration of sorbable component vs time) over incremental time periods. As seen in FIG. 3B, as time passes, the adsorbent becomes saturated. The effluent remains consistent until the bed has reached a percentage of saturation, at which point the sorbable component is no longer being adsorbed by the bed. The correlation between adsorbent loading and effluent is easily seen in FIG. 3B.

The adsorbent bed becomes saturated with impurities, depleting the adsorbent bed's adsorption capacity. At this point, the adsorber needs regeneration. Regeneration occurs by reversing the flow through the adsorber vessel 302 with a regeneration gas as described in FIGS. 2A and 2B above. Ideally, regeneration completely restores the original adsorption capacity of the bed, without any effect on the adsorbent itself. In practical applications, there may be a gradual ageing of the adsorbent over many regenerations, which may impact on its performance.

Adsorbents

Adsorbents may be any suitable adsorbent for the process feed and desired product. The adsorbent may be crystalline and may be in the form of particles in beads and pellets. Common adsorbents include molecular sieves, activated carbon, and activated alumina which come in a variety of shapes, sizes, and properties. Two or more different adsorbents may be used in an adsorber, for example the adsorbents may be in different layers. Suitable adsorbents for gas processing are UOP's Molsiv (molecular sieve) adsorbents. Adsorbents may last three to five years (e.g., 10,000 cycles).

Regeneration Gas

Adsorbents can be regenerated by stripping the impurities using a regeneration gas. The effect of the regeneration gas can be enhanced by passing by heating the regeneration gas prior to the adsorbent bed. For example, the gas may be heated up to 500 degrees F. Such regeneration gas may be pure, e.g., bone dry and sulphur free.

Problems Encountered

Adsorbers may be subjected to various issues, including but not limited to moisture breakthrough, spent catalyst, too high or too low pressure drop, over or under heating, over or under cooling, too high or too low flow rates, which can affect their performance or result in a shutdown of the adsorbers. Such issues may be caused by liquid carryover, bed support failure, bed lifting, agglomeration, flow imbalance, late stage attrition of sieve, adsorbent layer mixing (compound beds), solids accumulation, and/or hydrate formation.

Natural gas processors can become inefficient and profits can erode when natural gas liquid (NGL) production is reduced due to performance problems with the adsorbent beds. This is especially true when unscheduled molecular sieve recharges are required as a result of a process upset.

Monitoring

Monitoring the adsorbers and the processes using adsorbers may be performed to determine if the adsorbent bed is reaching saturation, other problems are occurring, or if equipment failures are imminent. Monitoring also helps to collect data that can be correlated and used to predict behavior or problems in different adsorbers used in the same plant or in other plants and/or processes.

For example, during the adsorption process as occurring in vessels 206 and 208 of FIG. 2A, the water load to the adsorber can be determined by monitoring/measuring the feed gas flow rate, feed pressure, feed temperature, and adsorption cycle time. During the regeneration process as occurring in vessel 210 of FIG. 2A, the heat input is determined by regeneration flow rate, regeneration heating temperature, and regeneration heating step time. During the regeneration process as occurring in vessel 210 of FIG. 2B, the heat input is determined by regeneration flow rate, regeneration cooling temperature, and regeneration cooling step time.

Figure 4:
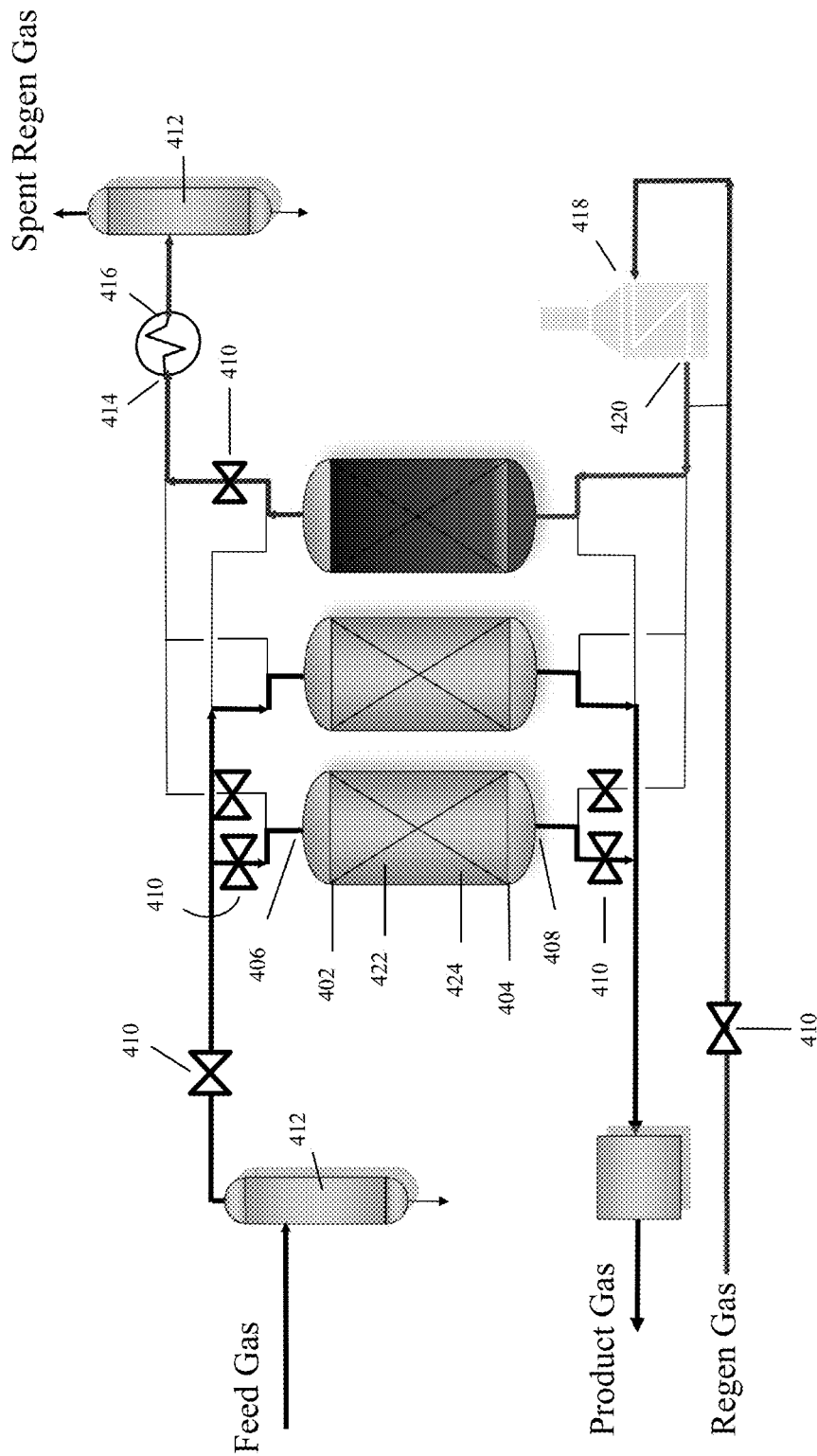
FIG. 4 depicts an illustrative adsorption process in accordance with one or more example embodiments.

Sensors may be used to monitor the process and equipment. Such sensors include, for example, temperature sensors, pressure sensors, flow sensors, moisture sensors/analyzers, gas valve position sensors, and bed status sensors. For example, as indicated in FIG. 4, sensors may be placed at the adsorbent bed inlet 402 and outlet 404, the main (common) inlet header 406, the main (common) outlet header 408, inlet/outlet/regeneration gas valve positions 410, knock-out drum 412 valve positions, cold box inlet 414 and outlet 416, and heat exchanger inlet 418 and outlets 420. Sensors may be placed within the adsorbent bed 422 and on the walls of the adsorber vessel 424.

Parameters that may be monitored include, but are not limited to, number of beds, adsorbent bed diameter, adsorbent bed fresh capacity, adsorbent bed end of life capacity, bed status (adsorption, heating, cooling, standby), number of cycles, adsorption time, heating regeneration time, cooling regeneration time, standby time, and pressurization/depressurization time. Other parameters include, but are not limited to, adsorbent start date (fresh load), expected adsorbent life, weight of adsorbent loaded, adsorbent type, adsorbent particle size, moisture breakthrough limit, adsorbent bed high pressure drop limit, and adsorbent bed outlet filter high pressure drop limit.

Feed gas parameters that are typically monitored include, but are not limited to, viscosity and water saturation. Regeneration gas parameters that are typically monitored include, but are not limited to, molecular weight and temperature. High pressure drop limits may be monitored for the cold box, heat exchanger, and deethanizer.

Monitoring of the process conditions will allow for corrective actions to avoid unscheduled shutdowns associated with reduced flow and irreparable adsorbent damage; provide data to help to optimize the performance of adsorption systems and increase the useful life of the adsorbent, reduce energy consumption, achieve ultra-low water effluent to increase NGL production, and reduce turnaround times.

There may or may not be anything that can be done to correct issues or problems associated with the issues in existing equipment, depending on the cause of the issues. In some aspects, process changes or operating conditions may be altered to preserve the equipment until the next scheduled maintenance period.

Process equipment used in the gas-treating process may deteriorate over time, affecting the performance and integrity of the process. Such deteriorating equipment may ultimately fail, but before failing, may decrease efficiency, yield, and/or product properties. Aspects of the disclosure may be used to identify such deteriorating equipment.

Furthermore, elements of plants may be exposed to the outside and thus can be exposed to various environmental stresses. Such stresses may be weather related, such as temperature extremes (hot and cold), high-wind conditions, and precipitation conditions such as snow, ice, and rain. Other environmental conditions may be pollution particulates, such as dust and pollen, or salt if located near an ocean, for example. Such stresses can affect the performance and lifetime of equipment in the plants. Different locations may have different environmental stresses. For example, a refinery in Texas may have different stresses than a chemical plant in Montana. Aspects of the disclosure can be used to identify if such stresses are occurring and suggest corrective action.

Sensor Data Collection and Processing

Figure 5A:
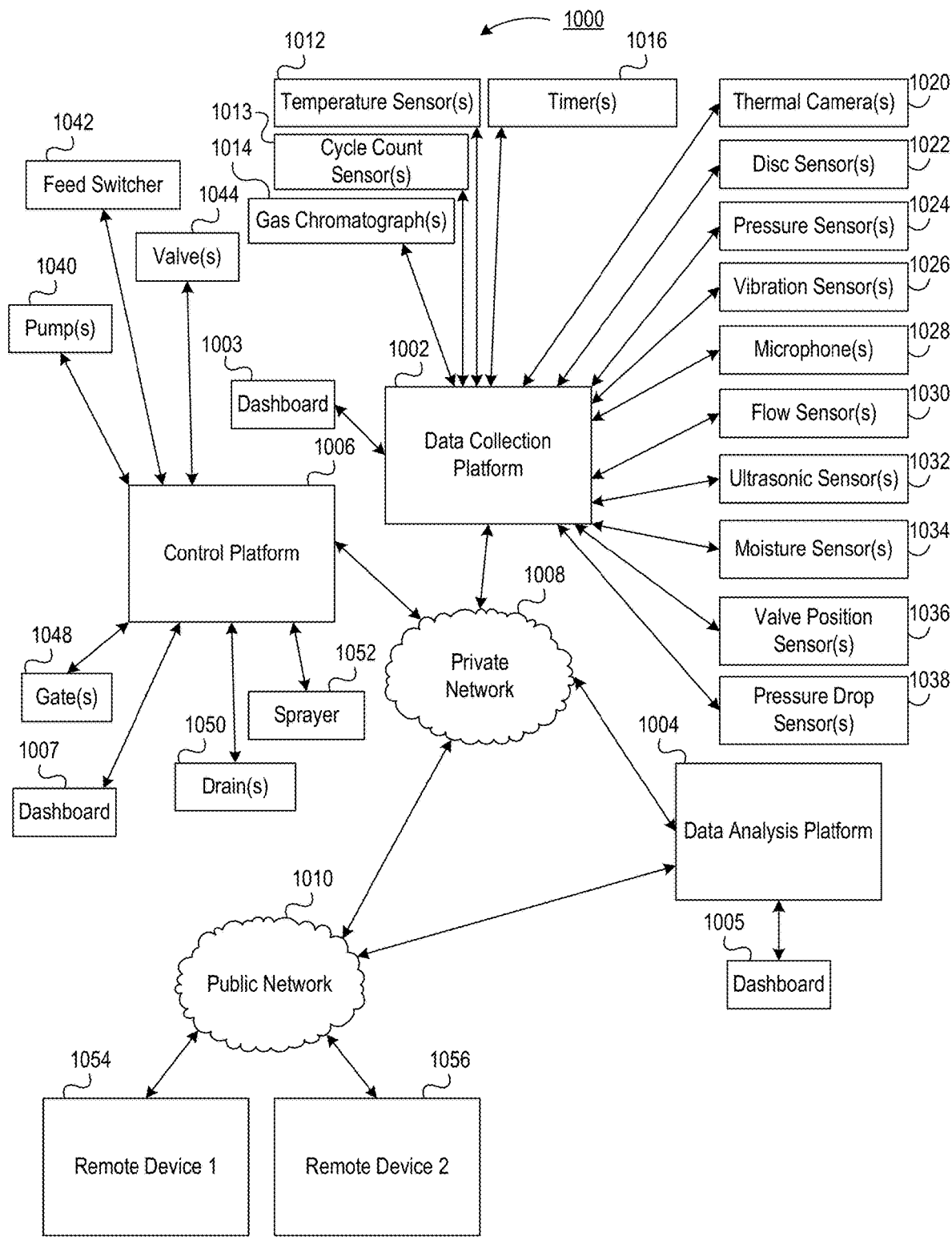
FIG. 5A depicts an illustrative computing environment for managing the operation of one or more pieces of equipment in a plant in accordance with one or more example embodiments.

The system may include one or more computing devices or platforms for collecting, storing, processing, and analyzing data from one or more sensors. FIG. 5A depicts an illustrative computing system that may be implemented at one or more components, pieces of equipment (e.g., adsorber), and/or plants. FIG. 5A-FIG. 5E (hereinafter collectively "FIG. 5"), show, by way of illustration, various components of the illustrative computing system in which aspects of the disclosure may be practiced. It is to be understood that other components may be used, and structural and functional modifications may be made, in one or more other embodiments without departing from the scope of the present disclosure. Moreover, various connections between elements are discussed in the following description, and these connections are general and, unless specified otherwise, may be direct or indirect, wired or wireless, and/or combination thereof, and that the specification is not intended to be limiting in this respect.

FIG. 5A depicts an illustrative operating environment in which various aspects of the present disclosure may be implemented in accordance with example embodiments. The computing system environment illustrated in FIG. 5A is only one example of a suitable computing environment and is not intended to suggest any limitation as to the scope of use or functionality contained in the disclosure. The computing system environment 1000 may include various sensor, measurement, and data capture systems, a data collection platform 1002, a data analysis platform 1004, a control platform 1006, one or more networks, one or more remote devices, and/or one or more other elements. The numerous elements of the computing system environment 1000 of FIG. 5A may be communicatively coupled through one or more networks. For example, the numerous platforms, devices, sensors, and/or components of the computing system environment 1000 may be communicatively coupled through a private network 1008. The sensors be positioned on various components in the plant and may communicate wirelessly or wired with one or more platforms illustrated in FIG. 5A. The private network 1008 may comprise, in some examples, a network firewall device to prevent unauthorized access to the data and devices on the private network. Alternatively, the private network 1008 may be isolated from external access through physical means, such as a hard-wired network with no external, direct-access point. The data communicated on the private network 1008 may be optionally encrypted for further security. Depending on the frequency of collection and transmission of sensor measurements and other data to the data collection platform 1002, the private network 1008 may experience large bandwidth usage and be technologically designed and arranged to accommodate for such technological issues. Moreover, the computing system environment 1000 may also include a public network 1010 that may be accessible to remote devices 1054, 1056. In some examples, the remote device (e.g., remote device 1054, remote device 1056) may be located not in the proximity (e.g., more than one mile away) of the various sensor, measurement, and data capture systems illustrated in FIG. 5A. In other examples, the remote device may be physically located inside a plant, but restricted from access to the private network 1008; in other words, the adjective "remote," need not necessarily require the device to be located at a great distance from the sensor systems and other components.

Although the computing system environment 1000 of FIG. 5A illustrates logical block diagrams of numerous platforms and devices, the disclosure is not so limited. In particular, one or more of the logical boxes in FIG. 5 may be combined into a single logical box or the functionality performed by a single logical box may be divided across multiple existing or new logical boxes. For example, aspects of the functionality performed by the data collection platform 1002 may be incorporated into one or each of the sensor devices illustrated in FIG. 5A. As such, the data collection may occur local to the sensor device, and the enhanced sensor system may communicate directly with one or more of the control platform and/or data analysis platform 1004. Such an embodiment is contemplated by FIG. 5A. Moreover, in such an embodiment, the enhanced sensor system may measure values common to a sensor, but may also filter the measurements such just those values that are statistically relevant or of-interest to the computing system environment are transmitted by the enhanced sensor system. As a result, the enhanced sensor system may include a processor (or other circuitry that enables execution of computer instructions) and a memory to store those instructions and/or filtered data values. The processor may be embodied as an application-specific integrated circuit (ASIC), FPGA, or other hardware- or software-based module for execution of instructions. In another example, one or more sensors illustrated in FIG. 5A may be combined into an enhanced, multi-purpose sensor system. Such a combined sensor system may provide economies of scale with respect to hardware components such as processors, memories, communication interfaces, and others.

In yet another example, the data collection platform 1002 and data analysis platform 1004 may reside on a single server computer and be depicted as a single, combined logical box on a system diagram. Moreover, a data store may be illustrated in FIG. 5A separate and apart from the data collection platform 1002 and data analysis platform 1004 to store a large amount of values collected from sensors and other components. The data store may be embodied in a database format and may be made accessible to the public network; meanwhile, the control platform 1006, data collection platform 1002, and data analysis platform 1004 may be restricted to the private network 1008 and left inaccessible to the public network 1010. As such, the data collected from a plant may be shared with users (e.g., engineers, data scientists, others), a company's employees, and even third parties (e.g., subscribers to the company's data feed) without compromising potential security requirements related to operation of a plant. The data store may be accessible to one or more users and/or remote devices over the public network 1010.

Referring to FIG. 5A, process measurements from various sensor and monitoring devices may be used to monitor conditions in, around, and on process equipment (e.g., adsorbers). Such sensors may include, but are not limited to, pressure sensors 1024, pressure drop sensors 1038, differential pressure sensors, disc sensors 1022, other flow sensors, temperature sensors 1012 including thermal cameras 1020 and skin thermocouples, capacitance sensors, microphones 1028, weight sensors, gas chromatographs 1014, moisture sensors 1034, ultrasonic sensors 1032, valve position sensors 1036, timing sensors 1016, vibration sensors 1026, cycle count sensors 1013, level sensors, liquid level (hydraulic fluid) sensors, and other sensors commonly found in the refining and petrochemical industry. Further, process laboratory measurements may be taken using gas chromatographs 1014, liquid chromatographs, distillation measurements, octane measurements, and other laboratory measurements. System operational measurements also can be taken to correlate the system operation to the adsorber measurements.

In addition, sensors may include transmitters and deviation alarms. These sensors may be programmed to set off an alarm, which may be audible and/or visual.

Other sensors may transmit signals to a processor or a hub that collects the data and sends to a processor. For example, temperature and pressure measurements may be sent to a hub (e.g., data collection platform 1002). In one example, temperature sensors 1012 may include thermocouples, fiber optic temperature measurement, thermal cameras 1020, and/or infrared cameras. Skin thermocouples may be applied to tubes, plates, or placed directly on a wall of an adsorber process unit. Alternatively, thermal (infrared) cameras 1020 may be used to detect temperature (e.g., hot spots) in one or more aspects of the equipment, including bundles (tubes). A shielded (insulated) tube skin thermocouple assembly may be used to obtain accurate measurements. One example of a thermocouple may be a removable XTRACTO Pad. A thermocouple can be replaced without any additional welding. Clips and/or pads may be utilized for ease of replacement. Fiber Optic cable can be attached to a unit, line, or vessel to provide a complete profile of temperatures.

Furthermore, flow sensors 1030 may be used in flow paths such as the inlet to the path, outlet from the path, or within the path. If multiple tubes are utilized, the flow sensors 1030 may be placed in corresponding positions in each of the tubes. In this manner, one can determine if one of the tubes is behaving abnormally compared to other tubes. Flow may be determined by pressure-drop across a known resistance, such as by using pressure taps. Other types of flow sensors 1030 may include, but are not limited to, ultrasonic, turban meter, hot wire anemometer, vane meter, Kármán™, vortex sensor, membrane sensor (membrane has a thin film temperature sensor printed on the upstream side, and one on the downstream side), tracer, radiographic imaging (e.g., identify two-phase vs. single-phase region of channels), an orifice plate in front of or integral to each tube or channel, pitot tube, thermal conductivity flow meter, anemometer, internal pressure flow profile, and/or measure cross tracer (measuring when the flow crosses one plate and when the flow crosses another plate).

Moisture level sensors may be used to monitor moisture levels at one or more locations. For example, moisture levels at an outlet may be measured. Additionally, moisture levels at an inlet or at a predetermined depth within the adsorber vessel may be measured. In some embodiments, a moisture level at an inlet may be known (e.g., a feed is used that has a known moisture level or moisture content).

A gas chromatograph 1014 on the feed to the adsorber vessels can be used to speciate the various components to provide empirical data to be used in calculations.

Sensor data, process measurements, and/or calculations made using the sensor data or process measurements may be used to monitor and/or improve the performance of the equipment and parts making up the equipment, as discussed in further detail below. For example, sensor data may be used to detect that a desirable or an undesirable chemical reaction is taking place within a particular piece of equipment, and one or more actions may be taken to encourage or inhibit the chemical reaction. Chemical sensors may be used to detect the presence of one or more chemicals or components in the streams, such as corrosive species, oxygen, hydrogen, and/or water (moisture). Chemical sensors may utilize gas chromatographs 1014, liquid chromatographs, distillation measurements, and/or octane measurements. In another example, equipment information, such as wear, efficiency, production, state, or other condition information, may be gathered and determined based on sensor data.

Corrective action may be taken based on determining this equipment information. For example, if the equipment is showing signs of wear or failure, corrective actions may be taken, such as taking an inventory of parts to ensure replacement parts are available, ordering replacement parts, and/or calling in repair personnel to the site. Certain parts of equipment may be replaced immediately. Other parts may be safe to continue to use, but a monitoring schedule may be adjusted. Alternatively or additionally, one or more inputs or controls relating to a process may be adjusted as part of the corrective action. These and other details about the equipment, sensors, processing of sensor data, and actions taken based on sensor data are described in further detail below.

Monitoring the adsorbers and the processes using adsorbers includes collecting data that can be correlated and used to predict behavior or problems in different adsorbers used in the same plant or in other plants and/or processes. Data collected from the various sensors (e.g., measurements such as flow, pressure drop, thermal performance, vessel skin temperature at the top, expansion bellows leak, vibration) may be correlated with external data, such as environmental or weather data. Process changes or operating conditions may be able to be altered to preserve the equipment until the next scheduled maintenance period. Fluids may be monitored for corrosive contaminants and pH may be monitored in order to predict higher than normal corrosion rates within the adsorber equipment. At a high level, sensor data collected (e.g., by the data collection platform) and data analysis (e.g., by the data analysis platform 1004) may be used together, for example, for process simulation, equipment simulation, and/or other tasks. For example, sensor data may be used for process simulation and reconciliation of sensor data. The resulting, improved process simulation may provide a stream of physical properties that are used to calculate heat flow, etc. These calculations may lead to thermal and pressure drop performance prediction calculations for specific equipment, and comparisons of equipment predictions to observations from the operating data (e.g., predicted/expected outlet temperature and pressure vs. measured outlet temperature and pressure). This causes identification of one or issues that may eventually lead to a potential control changes and/or recommendations, etc.

Systems Facilitating Sensor Data Collection

Sensor data may be collected by a data collection platform 1002. The sensors may interface with the data collection platform 1002 via wired or wireless transmissions. Sensor data (e.g., temperature data) may be collected continuously or at periodic intervals (e.g., every second, every five seconds, every ten seconds, every minute, every five minutes, every ten minutes, every hour, every two hours, every five hours, every twelve hours, every day, every other day, every week, every other week, every month, every other month, every six months, every year, or another interval). Data may be collected at different locations at different intervals. For example, data at a known hot spot may be collected at a first interval, and data at a spot that is not a known hot spot may be collected at a second interval. The data collection platform 1002 may continuously or periodically (e.g., every second, every minute, every hour, every day, once a week, once a month) transmit collected sensor data to a data analysis platform 1004, which may be nearby or remote from the data collection platform 1002.

Figure 5B:
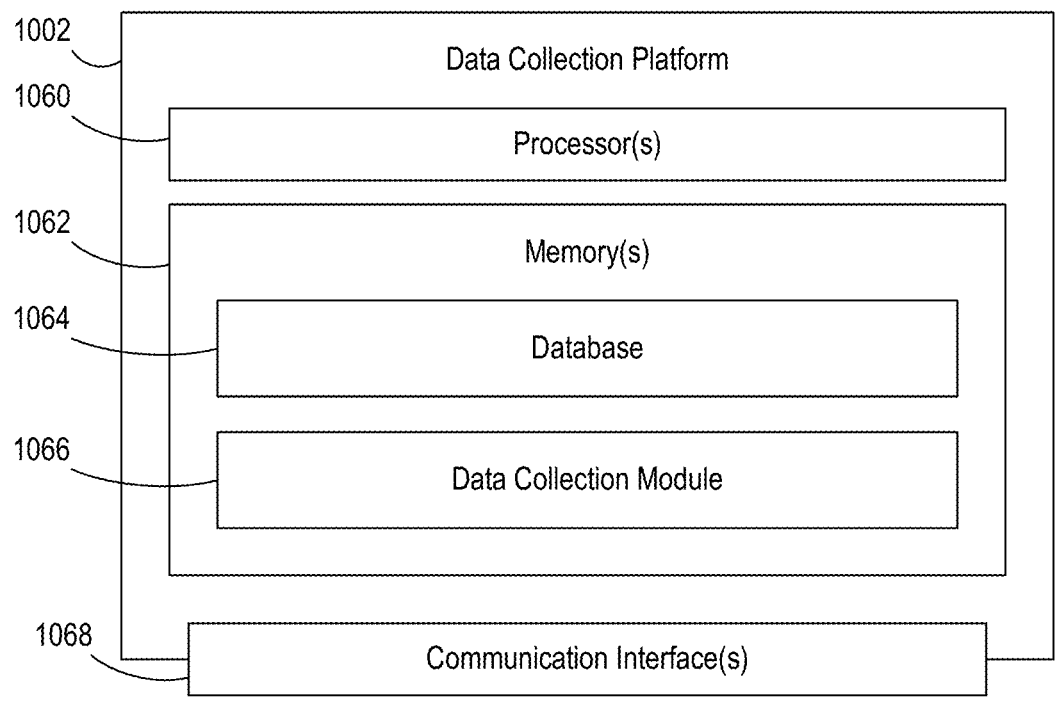
FIG. 5B depicts an illustrative data collection computing platform for collecting data related to the operation of one or more pieces of equipment in a plant in accordance with one or more example embodiments.
Figure 5C:
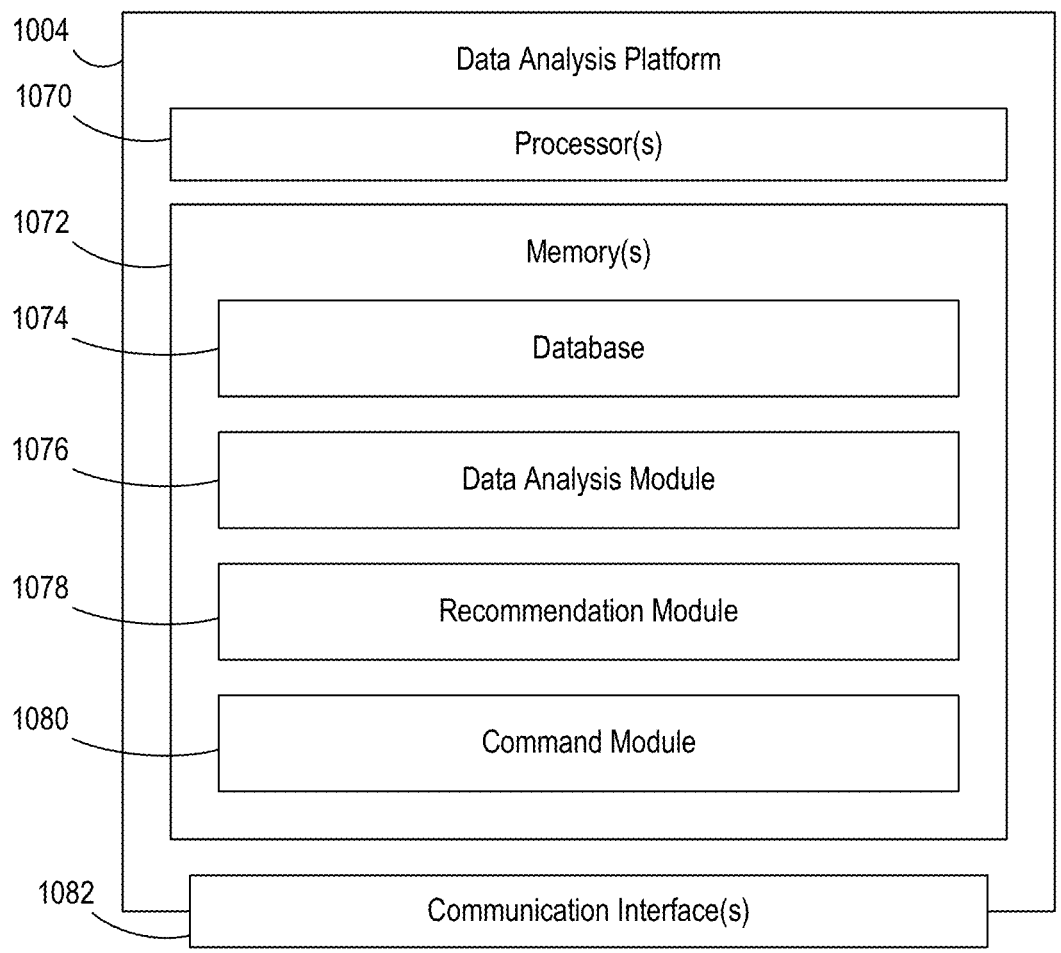
FIG. 5C depicts an illustrative data analysis computing platform for analyzing data related to the operation of one or more pieces of equipment in a plant in accordance with one or more example embodiments.
Figure 5D:
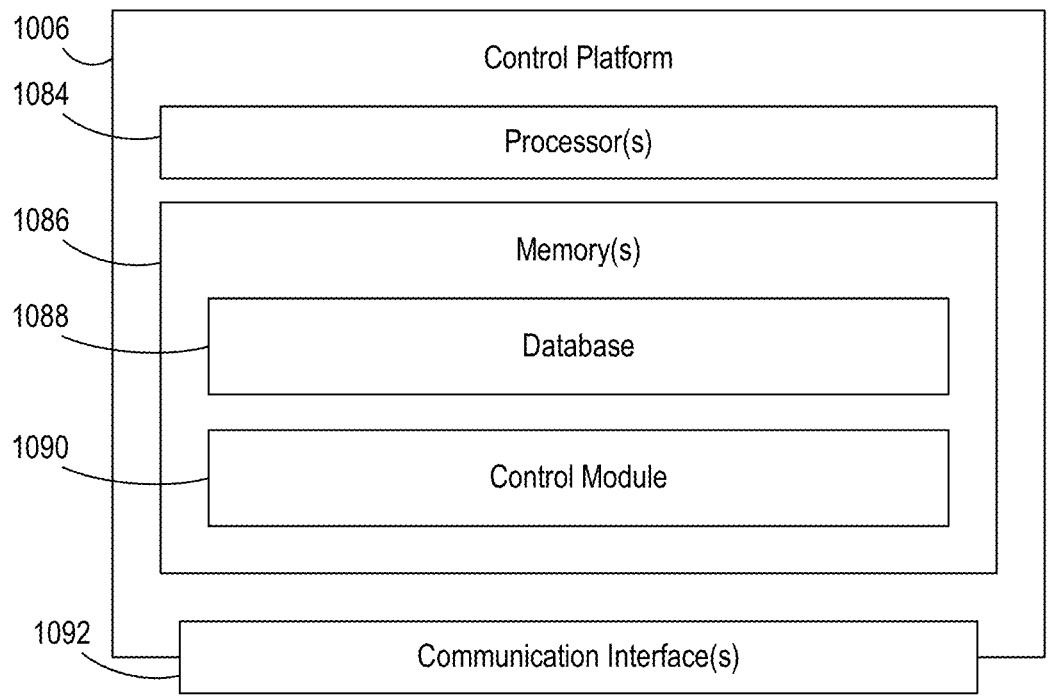
FIG. 5D depicts an illustrative data analysis computing platform for analyzing data related to the operation of one or more pieces of equipment in a plant in accordance with one or more example embodiments.
Figure 5E:
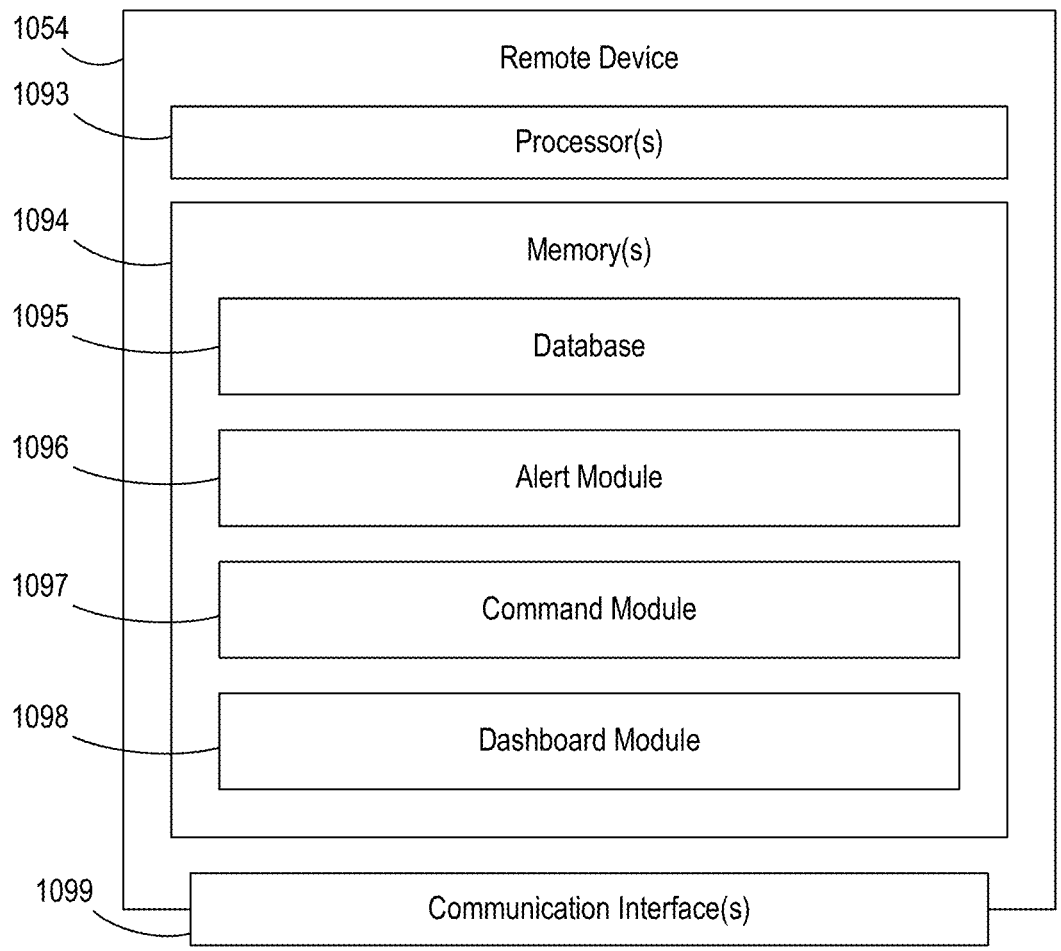
FIG. 5E depicts an illustrative control computing platform for controlling one or more parts of one or more pieces of equipment in a plant in accordance with one or more example embodiments.

The computing system environment of FIG. 5A includes logical block diagrams of numerous platforms and devices that are further elaborated upon in FIG. 5B, FIG. 5C, FIG. 5D, and FIG. 5E. FIG. 5B is an illustrative data collection platform 1002. FIG. 5C is an illustrative data analysis platform 1004. FIG. 5D is an illustrative control platform 1006. FIG. 5E is an illustrative remote device 1054. These platforms and devices of FIG. 5 include one or more processing units (e.g., processors) to implement the methods and functions of certain aspects of the present disclosure in accordance with the example embodiments. The processors may include general-purpose microprocessors and/or special-purpose processors designed for particular computing system environments or configurations. For example, the processors may execute computer-executable instructions in the form of software and/or firmware stored in the memory of the platform or device. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, programmable consumer electronics, network PCs, minicomputers, mainframe computers, distributed computing environments that include any of the above systems or devices, and the like.

In addition, the platform and/or devices in FIG. 5 may include one or more memories include any of a variety of computer-readable media. Computer-readable media may be any available media that may be accessed by the data collection platform, may be non-transitory, and may include volatile and nonvolatile, removable and non-removable media implemented in any method or technology for storage of information such as computer-readable instructions, object code, data structures, database records, program modules, or other data. Examples of computer-readable media may include random access memory (RAM), read only memory (ROM), electronically erasable programmable read only memory (EEPROM), flash memory or other memory technology, compact disk read-only memory (CD-ROM), digital versatile disks (DVD) or other optical disk storage, magnetic cassettes, magnetic tape, magnetic disk storage or other magnetic storage devices, or any other medium that can be used to store the desired information and that can be accessed by the data collection platform. The memories in the platform and/or devices may further store modules that may comprise compiled software code that causes the platform, device, and/or overall system to operate in a technologically improved manner as disclosed herein. For example, the memories may store software used by a computing platform, such as operating system, application programs, and/or associated database.

Furthermore, the platform and/or devices in FIG. 5 may include one or more communication interfaces including, but not limited to, a microphone, keypad, touch screen, and/or stylus through which a user of a computer (e.g., a remote device) may provide input, and may also include a speaker for providing audio output and a video display device for providing textual, audiovisual and/or graphical output. The communication interfaces may include a network controller for electronically communicating (e.g., wirelessly or wired) over a public network or private network with one or more other components on the network. The network controller may include electronic hardware for communicating over network protocols, including TCP/IP, UDP, Ethernet, and other protocols.

In some examples, one or more sensor devices in FIG. 5A may be enhanced by incorporating functionality that may otherwise be found in a data collection platform 1002. These enhanced sensor system may provide further filtering of the measurements and readings collected from their sensor devices. For example, with some of the enhanced sensor systems in the operating environment illustrated in FIG. 5A, an increased amount of processing may occur at the sensor so as to reduce the amount of data needing to be transferred over a private network 1008 in real-time to a computing platform. The enhanced sensor system may filter at the sensor itself the measured/collected/captured data and only particular, filtered data may be transmitted to the data collection platform 1002 for storage and/or analysis.

Referring to FIG. 5B, in one example, a data collection platform 1002 may comprise a processor 1060, one or more memories 1062, and communication interfaces 1068. The memory 1062 may comprise a database 1064 for storing data records of various values collected from one or more sources. In addition, a data collection module 1066 may be stored in the memory 1062 and assist the processor 1060 in the data collection platform 1002 in communicating with, via the communications interface 1068, one or more sensor, measurement, and data capture systems, and processing the data received from these sources. In some embodiments, the data collection module 1066 may comprise computer-executable instructions that, when executed by the processor, cause the data collection platform 1002 to perform one or more of the steps disclosed herein. In other embodiments, the data collection module 1066 may be a hybrid of software-based and/or hardware-based instructions to perform one or more of the steps disclosed herein. In some examples, the data collection module 1066 may assist an enhanced sensor system with further filtering the measurements and readings collected from the sensor devices. Although the elements of FIG. 5B are illustrated as logical block diagrams, the disclosure is not so limited. In particular, one or more of the logical boxes in FIG. 5B may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1064 in FIG. 5B is illustrated as being stored inside one or more memories 1062 in the data collection platform 1002, FIG. 5B contemplates that the database 1064 may be stored in a standalone data store communicatively coupled to the data collection module 1066 and processor 1060 of the data collection platform 1002 via the communications interface 1068 of the data collection platform 1002.

In addition, the data collection module 1066 may assist the processor 1060 in the data collection platform 1002 in communicating with, via the communications interface 1068, and processing data received from other sources, such as data feeds from third-party servers and manual entry at the field site from a dashboard graphical user interface (e.g., dashboard 1003). For example, a third-party server may provide contemporaneous weather data to the data collection module 1066. Some elements of chemical and petrochemical/refinery plants may be exposed to the outside and thus may be exposed to various environmental stresses. Such stresses may be weather related such as temperature extremes (hot and cold), high wind conditions, and precipitation conditions such as snow, ice, and rain. Other environmental conditions may be pollution particulates such as dust and pollen, or salt if located near an ocean, for example. Such stresses can affect the performance and lifetime of equipment in the plants. Different locations may have different environmental stresses. For example, a refinery in Texas will have different stresses than a chemical plant in Montana. In another example, data manually entered from a dashboard graphical user interface (or other means) may be collected and saved into memory by the data collection module 1066. Production rates may be entered and saved in memory. Tracking production rates may indicate issues with flows. For example, as fouling occurs, the production rate may fall if a specific outlet temperature can no longer be achieved at the targeted capacity and capacity has to be reduced to maintain the targeted outlet temperature.

Referring to FIG. 5C, in one example, a data analysis platform 1004 may comprise a processor 1070, one or more memories 1072, and communication interfaces 1082. The memory 1072 may comprise a database 1074 for storing data records of various values collected from one or more sources. Alternatively, the database 1074 may be the same database as that depicted in FIG. 5B and the data analysis platform 1004 may communicatively couple with the database via the communication interface 1082 of the data analysis platform 1004. At least one advantage of sharing a database between the two platforms is the reduced memory requirements due to not duplicating the same or similar data. In addition, a data analysis module 1076 may be stored in the memory 1072 and assist the processor 1070 in the data analysis platform 1004 in processing and analyzing the data values stored in the database 1074. In some embodiments, the data analysis module 1076 may comprise computer-executable instructions that, when executed by the processor, cause the data analysis platform 1004 to perform one or more of the steps disclosed herein. In other embodiments, the data analysis module 1076 may be a hybrid of software-based and/or hardware-based instructions to perform one or more of the steps disclosed herein. In some embodiments, the data analysis module 1076 may perform statistical analysis, predictive analytics, and/or machine learning on the data values in the database to generate predictions and models. For example, the data analysis platform 1004 may analyze sensor data to detect new hot spots and/or to monitor existing hot spots (e.g., to determine if an existing hot spot is growing, maintaining the same size, or shrinking) in the equipment of a plant. The data analysis platform 1004 may compare temperature data from different dates to determine if changes are occurring. Such comparisons may be made on a monthly, weekly, daily, hourly, real-time, or some other basis.

Referring to FIG. 5C, the recommendation module 1078 in the data analysis platform 1004 may coordinate with the data analysis module 1076 to generate recommendations for adjusting one or more parameters for the operation of the plant environment depicted in FIG. 5A. In some embodiments, the recommendation module 1078 may communicate the recommendation to the command module, which generates command codes that may be transmitted, via the communications interface 1082, to cause adjustments or halting/starting of one or more operations in the plant environment. The command codes may be transmitted to a control platform 1006 for processing and/or execution. In an alternative embodiment, the command codes may be directly communicated, either wirelessly or in a wired fashion, to physical components at the plant such that the physical components comprise an interface to receive the commands and execute on them.

In addition, the data analysis platform 1004 may communicate with, via the communications interface 1082, and process data received from other sources, such as data feeds from third-party servers and manual entry from a dashboard graphical user interface (e.g., dashboard 1005).

Although the elements of FIG. 5C are illustrated as logical block diagrams, the disclosure is not so limited. In particular, one or more of the logical boxes in FIG. 5C may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1074 is visually depicted in FIG. 5C as being stored inside one or more memories in the data analysis platform 1004, FIG. 5C contemplates that the database may be stored in a standalone data store communicatively coupled to the data analysis module 1076 and processor 1070 of the data analysis platform 1004 via the communications interface 1082 of the data analysis platform 1004. Furthermore, the databases from multiple plant locations may be shared and holistically analyzed to identify one or more trends and/or patterns in the operation and behavior of the plant and/or plant equipment. In such a crowdsourcing-type example, a distributed database arrangement may be provided where a logical database may simply serve as an interface through which multiple, separate databases may be accessed. As such, a computer with predictive analytic capabilities may access the logical database to analyze, recommend, and/or predict the behavior of one or more aspects of plants and/or equipment. In another example, the data values from a database from each plant may be combined and/or collated into a single database where predictive analytic engines may perform calculations and prediction models.

Referring to FIG. 5D, in one example, a control platform 1006 may comprise a processor 1084, one or more memories 1086, and communication interfaces 1092. The memory 1086 may comprise a database 1088 for storing data records of various values transmitted from a user interface, computing device, or other platform. The values may comprise parameter values for particular equipment at the plant. For example, some illustrative equipment at the plant that may be configured and/or controlled by the control platform 1006 may include, but is not limited to, a feed switcher 1042, sprayer 1052, one or more valves 1044, one or more pumps 1040, one or more gates 1048, and/or one or more drains 1050. In addition, a control module 1090 may be stored in the memory 1086 and assist the processor 1084 in the control platform 1006 in receiving, storing, and transmitting the data values stored in the database 1088. In some embodiments, the control module 1090 may comprise computer-executable instructions that, when executed by the processor, cause the control platform 1006 to perform one or more of the steps disclosed herein. In other embodiments, the control module 1090 may be a hybrid of software-based and/or hardware-based instructions to perform one or more of the steps disclosed herein.

In addition, the control platform 1006 may communicate with, via the communications interface 1092, and process data received from other sources, such as manual entry from a dashboard graphical user interface (e.g., dashboard 1007).

In a plant environment such as illustrated in FIG. 5A, if sensor data is outside of a safe range, this may be cause for immediate danger. As such, there may be a real-time component to the system such that the system processes and responds in a timely manner. Although in some embodiments, data could be collected and leisurely analyzed over a lengthy period of months, numerous embodiments contemplate a real-time or near real-time responsiveness in analyzing and generating alerts, such as those generated or received by the alert module 1096 in FIG. 5E.

Referring to FIG. 5E, in one example, a remote device 1054 may comprise a processor 1093, one or more memories 1094, and communication interfaces 1099. The memory 1094 may comprise a database 1095 for storing data records of various values entered by a user or received through the communications interface 1099. In addition, an alert module 1096, command module 1097, and/or dashboard module 1098 may be stored in the memory 1094 and assist the processor 1093 in the remote device 1054 in processing and analyzing the data values stored in the database. In some embodiments, the aforementioned modules may comprise computer-executable instructions that, when executed by the processor 1093, cause the remote device 1054 to perform one or more of the steps disclosed herein. In other embodiments, the aforementioned modules may be a hybrid of software-based and/or hardware-based instructions to perform one or more of the steps disclosed herein. In some embodiments, the aforementioned modules may generate alerts based on values received through the communications interface. The values may indicate a dangerous condition or even merely a warning condition due to odd sensor readings. The command module 1080 in the remote device 1054 may generate a command that when transmitted through the communications interface 1099 to the platforms at the plant, causes adjusting of one or more parameter operations of the plant environment depicted in FIG. 5A. In some embodiments, the dashboard module 1098 may display a graphical user interface to a user of the remote device to enable the user to enter desired parameters and/or commands. These parameters/commands may be transmitted to the command module 1080 to generate the appropriate resulting command codes that may be then transmitted, via the communications interface, to cause adjustments or halting/starting of one or more operations in the plant environment. The command codes may be transmitted to a control platform for processing and/or execution. In an alternative embodiment, the command codes may be directly communicated, either wirelessly or in a wired fashion, to physical components at the plant such that the physical components comprise an interface to receive the commands and execute them.

Although FIG. 5E is not so limited, in some embodiments the remote device 1054 may comprise a desktop computer, a smartphone, a wireless device, a tablet computer, a laptop computer, and/or the like. The remote device 1054 may be physically located locally or remotely, and may be connected by one of communications links to the public network 1010 that is linked via a communications link to the private network 1008. The network used to connect the remote device 1054 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links may be any communications links suitable for communicating between workstations and server, such as network links, dial-up links, wireless links, hard-wired links, as well as network types developed in the future, and the like. Various protocols such as transmission control protocol/Internet Protocol (TCP/IP), Ethernet, file transfer protocol (FTP), hypertext transfer protocol (HTTP) and the like may be used, and the system can be operated in a client-server configuration to permit a user to retrieve web pages from a web-based server. Any of various conventional web browsers can be used to display and manipulate data on web pages.

Although the elements of FIG. 5E are illustrated as logical block diagrams, the disclosure is not so limited. In particular, one or more of the logical boxes in FIG. 5E may be combined into a single logical box or the functionality performed by a single logical box may be divided across multiple existing or new logical boxes. Moreover, some logical boxes that are visually presented as being inside of another logical box may be moved such that they are partially or completely residing outside of that logical box. For example, while the database 1095 is visually depicted in FIG. 5E as being stored inside one or more memories in the remote device, FIG. 5E contemplates that the database may be stored in a standalone data store communicatively coupled, via the communications interface, to the modules stored at the remote device and processor of the remote device.

Referring to FIG. 5, in some examples, the performance of operation in a plant may be improved by using a cloud computing infrastructure and associated methods, as described in US Patent Application Publication No. US2016/0260041, which was published Sep. 8, 2016, and which is herein incorporated by reference in its entirety. The methods may include, in some examples, obtaining plant operation information from the plant and/or generating a plant process model using the plant operation information. The method may include receiving plant operation information over the Internet, or other computer network (including those described herein) and automatically generating a plant process model using the plant operation information. These plant process models may be configured and used to monitor, predict, and/or optimize performance of individual process units, operating blocks and/or complete processing systems. Routine and frequent analysis of predicted versus actual performance may further allow early identification of operational discrepancies which may be acted upon to optimize impact, including financial or other impact.

The aforementioned cloud computing infrastructure may use a data collection platform 1002 associated with a plant to capture data, e.g., sensor measurements, which may be automatically sent to the cloud infrastructure, which may be remotely located, where it may be reviewed to, for example, eliminate errors and biases, and used to calculate and report performance results. The data collection platform 1002 may include an optimization unit that acquires data from a customer site, other site, and/or plant (e.g., sensors and other data collectors at a plant) on a recurring basis. For cleansing, the data may be analyzed for completeness and corrected for gross errors by the optimization unit. The data may also be corrected for measurement issues (e.g., an accuracy problem for establishing a simulation steady state) and overall mass balance closure to generate a duplicate set of reconciled plant data. The corrected data may be used as an input to a simulation process, in which the process model is tuned to ensure that the simulation process matches the reconciled plant data. An output of the reconciled plant data may be used to generate predicted data using a collection of virtual process model objects as a unit of process design.

The performance of the plant and/or individual process units of the plant may be compared to the performance predicted by one or more process models to identify any operating differences or gaps. Furthermore, the process models and collected data (e.g., plant operation information) may be used to run optimization routines that converge on an optimal plant operation for a given values of, e.g., feed, products, and/or prices. A routine may be understood to refer to a sequence of computer programs or instructions for performing a particular task.

The data analysis platform 1004 may comprise an analysis unit that determines operating status, based on at least one of a kinetic model, a parametric model, an analytical tool, and a related knowledge and best practice standard. The analysis unit may receive historical and/or current performance data from one or a plurality of plants to proactively predict future actions to be performed. To predict various limits of a particular process and stay within the acceptable range of limits, the analysis unit may determine target operational parameters of a final product based on actual current and/or historical operational parameters. This evaluation by the analysis unit may be used to proactively predict future actions to be performed. In another example, the analysis unit may establish a boundary or threshold of an operating parameter of the plant based on at least one of an existing limit and an operation condition. In yet another example, the analysis unit may establish a relationship between at least two operational parameters related to a specific process for the operation of the plant. Finally in yet another example, one or more of the aforementioned examples may be performed with or without a combination of the other examples.

The plant process model may predict plant performance that is expected based upon plant operation information. The plant process model results can be used to monitor the health of the plant and to determine whether any upset or poor measurement occurred. The plant process model may be generated by an iterative process that models at various plant constraints to determine the desired plant process model.

Using a web-based system for implementing the method of this disclosure provides many benefits, such as improved plant economic performance due to an increased ability by plant operators to identify and capture economic opportunities, a sustained ability to bridge plant performance gaps, and an increased ability to leverage personnel expertise and improve training and development. Some of the methods disclosed herein allow for automated daily evaluation of process performance, thereby increasing the frequency of performance review with less time and effort required from plant operations staff.

Further, the analytics unit may be partially or fully automated. In one or more embodiments, the system may be performed by a computer system, such as a third-party computer system, remote from the plant and/or the plant planning center. The system may receive signals and parameters via the communication network, and displays in real time related performance information on an interactive display device accessible to an operator or user. The web-based platform allows all users to work with the same information, thereby creating a collaborative environment for sharing best practices or for troubleshooting. The method further provides more accurate prediction and optimization results due to fully configured models. Routine automated evaluation of plant planning and operation models allows timely plant model tuning to reduce or eliminate gaps between plant models and the actual plant performance. Implementing the aforementioned methods using the web-based platform also allows for monitoring and updating multiple sites, thereby better enabling facility planners to propose realistic optimal targets.

Figure 6B:
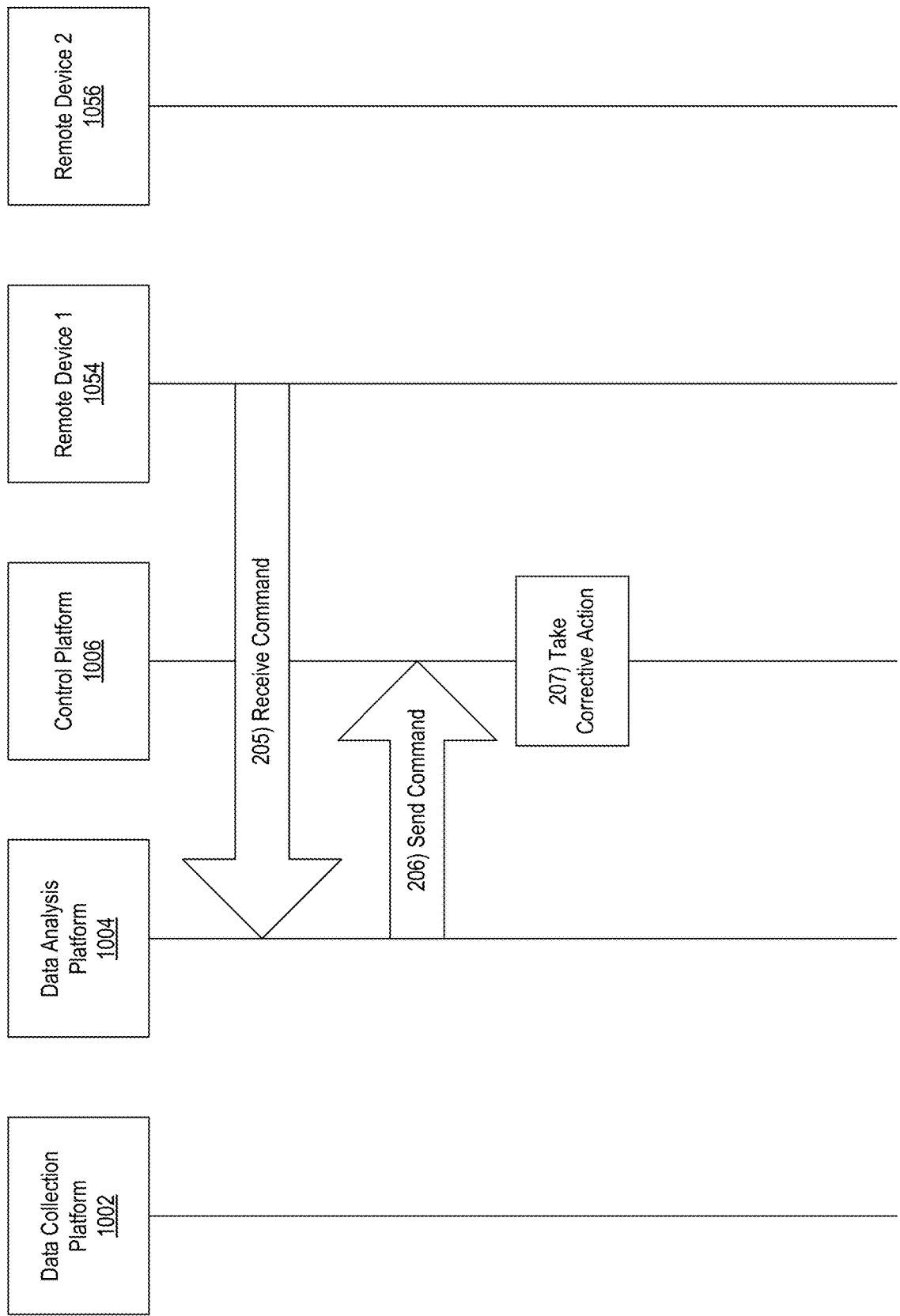

FIGS. 6A-6B depict illustrative system flow diagrams in accordance with one or more embodiments described herein. As shown in FIG. 6A, in step 201, data collection platform may collect sensor data. In step 202, data collection platform may transmit sensor data to data analysis platform. In step 203, data analysis platform may analyze data. In step 204, data analysis platform may send an alert to remote device 1 and/or remote device 2. In one or more embodiments, the alert may include information provided via a dashboard, such as the dashboard illustrated in FIG. 7.

As shown in FIG. 6B, in step 205, data analysis platform may receive a command from remote device 1 and/or remote device 2. In some embodiments, the control platform may receive the command from remote device 1 and/or remote device 2. In one or more embodiments, receiving the command may include receiving the command via a dashboard, such as the dashboard illustrated in FIG. 7. In step 206, data analysis platform may send a command to control platform. In some embodiments, the command may be similar to the command received from remote device 1 and/or remote device 2. In some embodiments, data analysis platform may perform additional analysis based on the received command from remote device 1 and/or remote device 2 before sending a command to control platform. In step 207, control platform may adjust an operating parameter. The adjusting the operating parameter may be based on the command received from data analysis platform, remote device 1, and/or remote device 2. The adjusting the operating parameter may be related to one or more pieces of equipment (e.g., adsorber) associated with sensors that collected the sensor data in step 201. For example, a flow rate may be increased or decreased, a valve may be opened or closed, a process may be started, stopped, extended, or shortened, or the like.

Detecting and Addressing Problems with Adsorbers

Aspects of the present disclosure are directed to monitoring adsorption processes for potential and existing issues, providing alerts, and/or adjusting operating conditions to optimize adsorbent life.

There are many process limitations that may be monitored including, but not limited to, maximum throughput, maximum feed temperature, maximum feed pressure, maximum regeneration flow rate, maximum regeneration heater temperature, and maximum regeneration flow rate. Process performance indicators may include, but are not limited to, unit capacity (throughput ratio versus name plate capacity/target throughput); unit product (product gas quality versus specification target); unit utilization (ratio of actual water load versus theoretical load capable to be removed for given adsorbent service life at prevailing conditions); unit regeneration efficiency (actual regeneration gas consumption versus theoretically calculated for given adsorbent duty; maximum achieved bed heating outlet temperature); differential pressure across adsorbent unit (ratio of actual DP normalized versus fresh adsorbent bed DP for design throughput during adsorption and regeneration step); temperature limits (actual versus maximum recommended feed gas temperature; actual versus minimum recommended regeneration gas heating temperature) adsorption cycle step times (actual cycle length versus DCS timer settings); pressure changes and valve switching step times (duration & rate of pressure changes or sequence valves switching); adsorbent life curve data (historical adsorption cycle times per cycle since unit start-up normalized for design throughput); knock out drum drain valve "open-time"; cycle phase timers; accumulated water per bed per cycle; regeneration temperature profiles; and the like.

In one example, a system may monitor an amount of water being adsorbed in an adsorbent bed and determine when the adsorber needs to be taken offline and the adsorber regenerated.

In some embodiments, based on one or more operating conditions and/or performance characteristics, a system may automatically adjust one or more operating characteristics of an adsorber system to optimize system performance. In one example, the system may adjust cycle times. In another example, the system may increase capacity, reduce an amount of feed, increase the amount of feed, or the like. Adjusting the operating characteristics may be performed in an iterative fashion.

In some embodiments, a system may determine operating characteristics. The system may determine system performance characteristics. The system may determine optimal operating characteristics (e.g., optimal cycle times). The system may determine whether there is a difference between last-cycle operating performance and the optimal operating performance. If there is a difference, the system may adjust one or more operating characteristics to decrease the difference between the actual operating performance in the next cycle and the optimal operating performance. After the next cycle, the system may determine whether there is a difference between the actual operating performance and the optimal performance, and if so, again adjust operating characteristics for the next cycle to again decrease the difference. By iteratively reviewing recent performance and adjusting characteristics in anticipation of a next cycle, the system may thereby optimize the operating performance for an adsorber process unit. This may result in improved performance, e.g., extend adsorbent life.

Processing Sensor Data

One or more calculations may be performed for an adsorbent remote monitoring service. These calculations may assist in alerting and helping diagnose the status of adsorbent used for dehydration in natural gas processing units.

The data analysis platform (e.g., data analysis platform 1004) may receive (e.g., from one or more sensors) one or more operational parameters, which may be used alone or in combination for determining the status of the adsorbent. As an example, illustrative operational parameters may include one or more of adsorbent bed inlet temperature, adsorbent bed outlet temperature, adsorbent bed pressure, adsorbent bed pressure drop, adsorbent bed feed gas flow, adsorbent bed outlet moisture analyzer, main inlet header total feed gas flow, main inlet header temperature, main inlet header pressure, main inlet header moisture content, adsorbent bed common outlet header moisture content, adsorbent regeneration heating gas flow, adsorbent regeneration heating gas temperature, adsorbent regeneration cooling gas flow, adsorbent regeneration cooling gas temperature, adsorbent regeneration heating gas flow, inlet gas valve positions, outlet gas valve positions, regeneration gas valve positions, bed status (e.g., adsorption, heating, cooling, standby), spent regeneration knock-out drum valve position (e.g., water discharge), cold box pressure drop (e.g., plate and frame heat exchanger), deethanizer pressure drop, heat exchangers pressure drop (e.g., downstream of adsorbent beds), adsorbent bed outlet filter delta pressure, number of cycles, actual adsorption time, actual heating regen time, actual cooling regen time, actual standby time, and/or actual pressurization/depressurization.

The data analysis platform may use one or more design parameters, alone or in combination, for determining the status of the adsorbent. As an example, illustrative design parameters may include number of beds total, number of beds in standby, adsorbent start of life date (fresh load), expected adsorbent life, adsorbent bed diameter, weight of adsorbent loaded, adsorbent type (e.g., UI-94, UI-900), adsorbent particle size, flow direction during adsorption, flow direction during heating, flow direction during cooling, average residual loading (Xr), maximum allowable working pressure (MAWP), adsorbent bed fresh capacity, adsorbent bed end of life capacity, moisture breakthrough limit, adsorbent bed high pressure drop limit, cold box (e.g., plate and frame heat exchanger) high pressure drop limit, heat exchanger high pressure drop limit, adsorbent bed outlet filter high pressure drop limit, deethanizer high pressure drop limit, feed gas molecular weight, feed gas viscosity, feed gas water saturation percentage, and/or regeneration gas molecular weight.

In some instances, the timestamp of a calculated attribute may match the timestamp of the raw data used for the calculation. In some instances, a calculated attribute may use one or more results of one or more other calculated attributes; therefore, the order in which the attributes are calculated may be relevant.

In some embodiments, raw values may be checked for bad values. If bad values are detected, the data analysis platform may either skip calculation or replace the bad value with NULL, as appropriate for subsequent calculations. For averages, a provision may be made to skip bad/null values and/or timestamps.

Some units of measurement for variables may be specified. Some variables may be dimensionless, and therefore might not have a defined unit of measurement.

Dashboard

Figure 7:
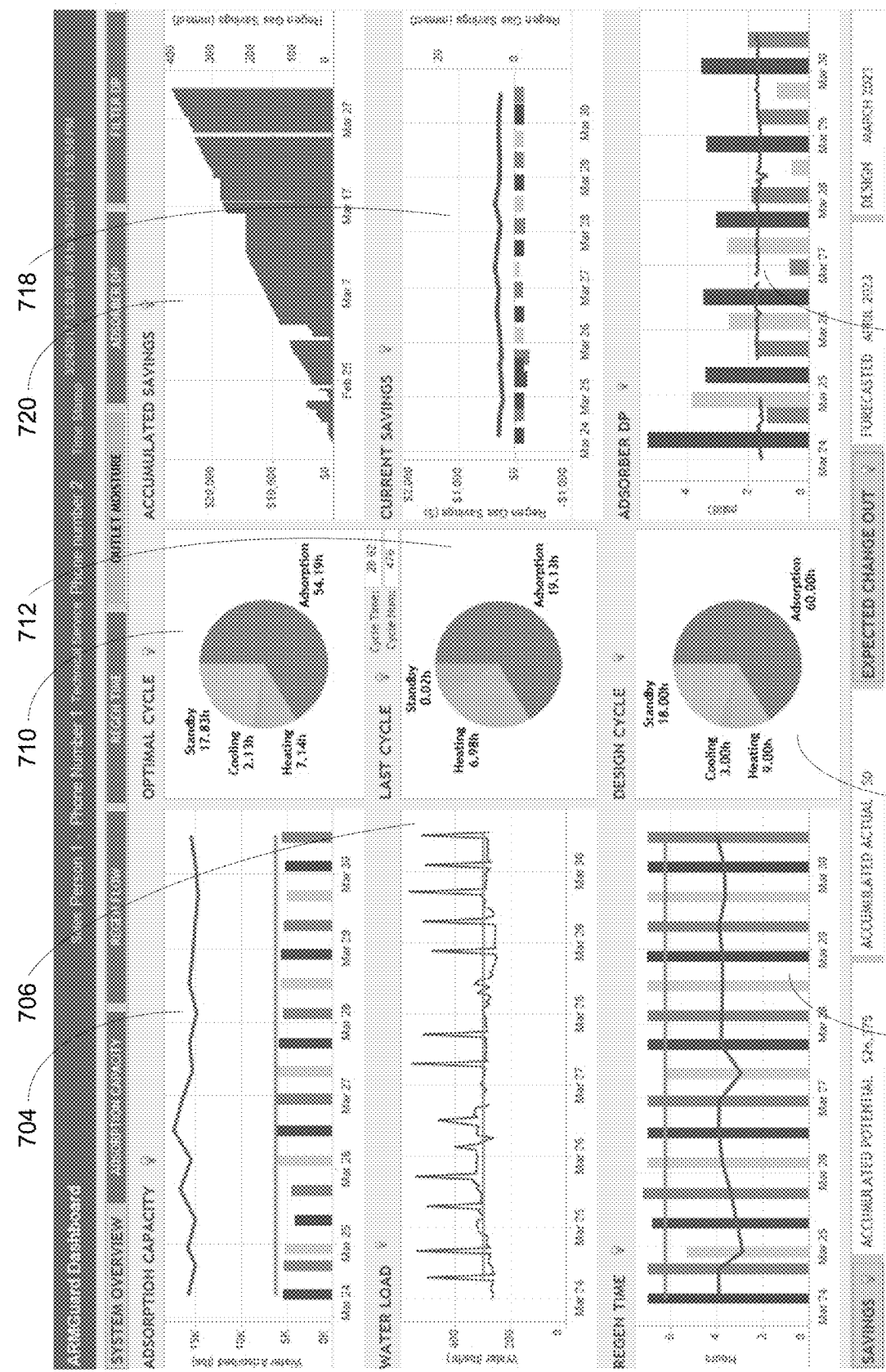
FIG. 7 depicts an illustrative dashboard for viewing information and/or taking actions related to one or more aspects of a plant operation in accordance with one or more example embodiments.

FIG. 7 depicts an illustrative dashboard that may include information about the operation of an adsorber in accordance with one or more aspects described herein. The dashboard may include or be a part of one or more graphical user interfaces of one or more applications that may provide information received from one or more sensors or determined based on analyzing information received from one or more sensors, according to one or more embodiments described herein. The dashboard may be displayed as part of a smartphone application (e.g., running on a remote device, such as remote device 1 or remote device 2), a desktop application, a web application (e.g., that runs in a web browser), a web site, an application running on a plant computer, or the like.

The dashboard may include one or more visual representations of data (e.g., chart, graph) that shows information about a plant, a particular piece of equipment in a plant, or a process performed by a plant or a particular piece or combination of equipment in the plant. For example, a graph may show information about an operating condition, an efficiency, a production level, or the like. The dashboard may include a description of the equipment, the combination of equipment, or the plant to which the visual display of information pertains.

The dashboard may display the information for a particular time or period of time (e.g., the last five minutes, the last ten minutes, the last hour, the last two hours, the last 12 hours, the last 24 hours, multiple days, multiple months). The dashboard may be adjustable to show different ranges of time, automatically or based on user input.

The dashboard may include a contact name and/or contact information (e.g., telephone number, pager number, email address, text message number, social media account name) for a sales representative. Then, for example, if a dashboard user needs assistance (e.g., purchasing more adsorbents, finding out more information about purchased products), the dashboard user may easily contact the sales representative.

The dashboard may include a contact name and/or contact information for technical support. Then, for example, if the dashboard user using the dashboard needs assistance (e.g., interpreting dashboard data, adjusting a product level, adjusting an equipment setting, adjusting an operating characteristic), the dashboard user may easily contact technical support.

The dashboard may display a time and/or date range of the time and/or date range for which data is being displayed.

The dashboard may include one or more tabs. The tabs may be associated with dashboard screens, pop-up windows, or overlays. For example, the one or more tabs may include one or more of system overview, adsorption capacity, regen flow, regen time, outlet moisture, adsorber DP, filter DP, or the like.

The dashboard may include, on one or more graphs, a line indicating an optimum operating level (e.g., a green line). Specifically, the line may indicate, based on one or more calculations, an optimum level at which a particular adsorber process unit should be operated (e.g., relative to a particular operating characteristic) to achieve an optimization goal. The optimum operating level may be dynamic, based on a re-calculation of an optimum operating level using one or more operational and/or design characteristics. In an example, the optimization goal may be to optimize a life of the adsorber process unit, a life of the adsorber, a life of another chemical, or the like. In a specific example, on a graph of adsorption capacity, the line indicating optimum operating level may indicate an optimum amount of water adsorbed by a particular adsorber process unit in a unit of time (e.g., a cycle, a day). In another example, the line indicating the optimum operating level may indicate an optimum amount of time that a particular adsorber process unit should be operated in regeneration mode (e.g., an amount of time that achieves full regeneration but does not spend more time than necessary).

The dashboard may include, on one or more graphs, a line indicating a design level (e.g., an orange line). Specifically, the line may indicate the level at which the equipment was designed to operate, e.g., for a particular cycle. The design line may be static. The design line may be provided by, e.g., an entity associated with a design of the equipment, the plant, or the like. In an example, on a graph of adsorption capacity, the design level may indicate an amount of adsorption capacity (e.g., water adsorption) that a process unit is designed to have when operating for an amount of time (e.g., a day). In another example, on a graph of water load, the design level may indicate an amount of water load that the system is designed to have capacity for at a particular time. In a further example, on a graph of regen time, the design level may indicate a number of hours that a process unit is designed to be operated in regeneration mode.

The dashboard may include, on one or more graphs, a line, bar, or other indicator of an actual operating result. The actual operating result may be related to a time and/or date range (e.g., the displayed time and/or date range). The actual operating result may be related to a particular adsorber process unit (e.g., dark blue for a first adsorber process unit, medium blue for a second adsorber process unit, light blue for a third adsorber process unit). The actual operating result may be dynamic. In an example, on a graph of adsorption capacity, an actual operating result may be an amount of adsorption achieved by a particular adsorber process unit in a particular time (e.g., an amount of water adsorbed in a cycle, in a day). In another example, on a graph of water load, an actual operating result may be an amount of water load that an adsorber system is under at a given point in time. In another example, on a graph of regen time, an actual operating result may be an amount of time that a particular adsorber process unit is operated in regeneration mode.

Adsorbent may be designed to be used for a particular period of time (e.g., 60 hours per cycle). By optimizing each cycle (e.g., lengthening the cycle when possible, shortening the cycle when necessary) the adsorbent may be used for an increased overall number of production hours over the life of the adsorbent. For example, instead of using the adsorbent for the designed-for amount of cycle time (e.g., 60 hours), if the adsorbent is actually capable of adsorbing for a longer period of time (e.g., 65 hours, 70 hours, 80 hours, 90 hours), and the adsorbent is used for the longer period of time (e.g., until the adsorbent is no longer capable of adsorbing in a particular cycle), the adsorbent may be used for increased production over the adsorbent's life. By optimizing the adsorbent usage in each cycle, the overall life of the adsorbent may be extended (e.g., adsorbent may be used for four years before needing to be replaced instead of three years). This may lead to increased production and lower production costs.

The dashboard may include a graph that shows adsorption capacity (e.g., adsorption capacity graph 704). The adsorption capacity may indicate, for example, start of run, end of run, how long the system was running, how much water the adsorbent can adsorb, how much water has the adsorbent adsorbed for the different vessels, and/or additional information. Each different vessel (e.g., adsorber process unit) may be correlated with a different color (e.g., dark blue, medium blue, light blue). The adsorption capacity graph may show one or more of an optimal amount of water adsorbed (e.g., green line), an amount of water actually adsorbed by a particular adsorption bed (e.g., blue bar), and/or an amount of water that a particular adsorption bed was designed to adsorb (e.g., orange line). In some instances, if the actual water adsorbed (e.g., blue bar) is higher than the optimal amount (e.g., green line), the adsorption unit may experience breakthrough.

In some embodiments, the dashboard may include a display of outlet moisture. Outlet moisture may be measured from an adsorbent bed. In some embodiments, outlet moisture may be very low. Outlet moisture may be used for, e.g., end-of-life determinations for adsorbent, for breakthrough determinations and/or predictions, and the like. In some instances, if no capacity is left on adbsorbent, the adsorbent may need to be replaced. In some instances, adsorbent that is at or near an end-of-life may be used in a process at a lower flow rate (e.g., 25% flow, 50% flow, 75% flow). This may, however, be inefficient.

The dashboard may include a graph that shows water load (e.g., water load graph 706). Water load may provide feedback on the water content of the feed compared with the water load that the system was designed for. If the water content drops below the level that the system was designed for, there may be an opportunity to optimize cycle time (e.g., extend cycle time). For example, the cycle time may be extended, since the system is running below capacity. In some embodiments, as depicted in FIG. 7, the water load may include a design line (e.g., showing a design basis water content) and/or a current water content line (e.g., showing current water content). Water content may be displayed in pounds per hour. The water load may show a realistic real-time amount of water being processed by the system. In some embodiments, the goal may be to remove all water from natural gas being processed by the system.

In some embodiments, the dashboard may include a regeneration time graph (e.g., regeneration time graph 708). A regeneration process may be used to regenerate the adsorber. An adsorber may need to be regenerated for a particular amount of time (e.g., two hours, three hours, four hours, five hours, six hours, nine hours, ten hours). The regeneration process may include cycling one or more gases through the adsorber. The gases may be a high temperature (e.g., 500 degrees F.). The regeneration process may be expensive, e.g., because of the cost of the gas, the cost of utilities to compensate for heat added to the system at the plant, the cost of downtime (adsorption cannot be performed while regeneration is being performed), and the like. In some embodiments, regeneration degrades and/or damages the adsorbent. Therefore, over time, adsorbent that has been regenerated for a particular number of hours may need to be replaced. Therefore, the system may determine, based on one or more operation and/or design characteristics, how to minimize the amount of regeneration time and/or how to extend the cycle time, which may extend the amount of time between regeneration cycles.

The regeneration time graph may include design basis time (e.g., orange line), which may be a number of hours needed for regeneration, according to a design of the system. The regeneration time graph may include an amount of time actually spent performing regeneration (e.g., blue bar). The regeneration time graph may include an indication of an optimal amount of time that should be spent performing regeneration, which may be dynamically determined using one or more operating and/or design characteristics. The time spent performing regeneration that is above the time needed for regeneration (e.g., design time, optimal time) may represent an optimization that may be performed and/or achieved. Specifically, by reducing the amount of time spent performing regeneration (e.g., blue bar) beyond the time needed for regeneration (e.g., time above the orange line and/or above the green line), the adsorber(s) may be fully regenerated without spending excess utilities for excess and unneeded regeneration. Furthermore, excess regeneration may, in some embodiments, cause additional damage to adsorber units, and therefore reducing unnecessary regeneration time may extend a life of an adsorber unit.

The dashboard may include one or more charts (e.g., optimal cycle chart 710, last cycle chart 712, design cycle chart 714) showing breakdowns of the different phases of a particular cycle for one or more adsorber process units. The dashboard may include, for example, one or more charts showing optimal cycle (e.g., optimal cycle chart 710), last cycle (e.g., last cycle chart 712), design cycle (e.g., design cycle chart 714). The charts may include one or more of adsorption time, heating time, cooling time, and/or standby time.

An optimal cycle chart (e.g., optimal cycle chart 710) may show a breakdown of an optimal adsorption cycle. This breakdown may be dynamically determined and/or updated based on one or more operating and/or design characteristics. In some aspects, the optimal cycle may show an optimal amount of adsorption time, heating time, cooling time, and standby time that should be attempted in order to maximize the life of adsorbent in a particular adsorber process unit. Even if the optimal cycle times are not achieved, by adjusting one or more process variables to operate a particular adsorption process unit closer to the optimal cycle times, an operator and/or a control computing platform may achieve extended adsorbent life.

A design cycle chart (e.g., design cycle chart 714) may show a breakdown of a design adsorption cycle. Specifically, the design cycle chart may show a breakdown of the times that a particular adsorption process unit was designed to be performing adsorption, heating, cooling, and in standby, in a particular cycle. The design cycle chart may be static over multiple cycles for a particular adsorber process unit.

A last cycle chart (e.g., last cycle chart 712) may show a breakdown of a most-recent adsorption cycle. This breakdown may be dynamically determined and/or updated based on a most recent cycle of a particular adsorber process unit. The last cycle chart may show a breakdown of a last cycle for a particular adsorber process unit, the breakdown showing adsorption time, heating time, and/or cooling time that the unit was operated. This information may be displayed concurrently and/or adjacent to an optimal cycle and/or a design cycle, which may allow an operator to easily compare the last cycle for an adsorber process unit to the optimal cycle and/or design cycle for that particular adsorber process unit. In some embodiments, the dashboard may include a chart, text, graph, or other visualization of a difference between the last cycle and the optimal cycle and/or the design cycle. Alternatively or additionally, the dashboard may include one or more recommendations for changes to make to one or more operating characteristics, based on comparing the last cycle and the optimal cycle and/or the design cycle, so that the next cycle for one or more adsorber process units has a smaller difference from the optimal cycle and/or the design cycle than the difference between the last cycle and the optimal cycle and/or the design cycle.

The dashboard may therefore allow an operator to confirm whether one or more adsorber process units are operating within healthy operating times. This may give the operator additional confidence and/or information about how to adjust one or more operating characteristics for the adsorber process unit to optimize adsorbent life while minimizing risk to the process outcomes.

The dashboard may include an adsorber differential pressure (DP) chart (e.g., adsorber DP chart 716). DP may be an overall health indicator for adsorbent. In some embodiments, rate of change of DP may be a stronger indicator of adsorbent health than actual value of DP. The adsorber DP chart may include a line (e.g., green line) that shows an ideal adsorber DP. The adsorber DP chart may include one or more bars that show actual adsorber DP, e.g., each bar corresponding to a particular adsorber process unit.

The dashboard may include an indication of an expected date that the adsorbent will need to be changed. The indication may include a dynamic forecasted change-out date, which may be dynamically calculated based on one or more operating characteristics. The actual results of the adsorbent performance may be used in these calculations. The forecasted change-out date may be displayed with a visual indicator of a life phase or status of the adsorbent. For example, if the adsorbent is healthy, the visual indicator may be green. In another example, if the adsorbent is starting to have decreased performance, the visual indicator may be yellow, which may indicate that an operator might consider observing adsorbent performance. In another example, if adsorbent replacement is imminent, the visual indicator may be red.

The indication may alternatively or additionally include a static design change-out date, which may be calculated at or near a beginning of an adsorbent life, and may be based on a prediction of a life length of that adsorbent. By showing the design change-out date and the forecasted change-out date, a dashboard user may see how the adsorbent is performing relative to how the adsorbent was forecasted to perform.

The dashboard may include one or more charts showing savings, e.g., based on optimizing adsorbent operating characteristics (e.g., extending cycle times on a cycle-by-cycle basis, based on actual performance). For example, a savings chart (e.g., current savings chart 718) may show current savings based on a cost of an amount of regeneration fuel saved by performing regeneration for only a required amount of time, rather than a different amount of time that is longer than the required amount of time (e.g., the savings number may be based on a mean or most-recent amount of regeneration time, which may be an amount of time that regeneration was previously performed for a same adsorber process unit).

In another example, a savings chart (e.g., accumulated savings chart 720) may show an accumulated amount of savings, which may be a dynamically increasing total number of dollars that the operator saved by optimizing adsorbent operating characteristics (e.g., extending cycle times on a cycle-by-cycle basis, based on actual performance).

The dashboard may include an indication of whether a particular adsorber unit experienced moisture breakthrough, and/or operating conditions that led to the moisture breakthrough. For example, the dashboard may include an indication of whether there was moisture breakthrough in a last threshold amount (e.g., 10%) of an adsorbent cycle.

The dashboard may include one or more buttons that allow a user to take one or more actions. For example, the dashboard may include a button (e.g., an "Actions" button) that, when pressed, shows one or more actions available to the user. The dashboard may include a button (e.g., a "Change View" button) that, when pressed, changes one or more views of one or more elements of the dashboard. The dashboard may include a button (e.g., a "Settings" button) that, when pressed, shows one or more settings of the application of which the dashboard is a part. The dashboard may include a button (e.g., a "Refresh Data" button) that, when pressed, refreshes data displayed by the dashboard. In some aspects, data displayed by the dashboard may be refreshed in real time, according to a preset schedule (e.g., every five seconds, every ten seconds, every minute), and/or in response to a refresh request received from a user. The dashboard may include a button (e.g., a "Send Data" button) that, when pressed, allows a user to send data to one or more other devices. For example, the user may be able to send data via email, SMS, text message, iMessage, FTP, cloud sharing, AirDrop, or some other method. The user may be able to select one or more pieces of data, graphics, charts, graphs, elements of the display, or the like to share or send. The dashboard may include a button (e.g., an "Analyze Data" button) that, when pressed, causes one or more data analysis functions to be performed. In some aspects, the user may provide additional input about the desired data analysis, such as desired input, desired output, desired granularity, desired time to complete the data analysis, desired time of input data, or the like.

The data collected by this system may provide a historical information of events, operations, and/or data. This information can be modelled to predict and/or anticipate future issues. This can be used to call for proactive maintenance actions and/or make corrective actions to the operation of the process unit to have an uninterrupted service.

Alerts

In some embodiments, a graphical user interface of an application may be used for providing alerts and/or receiving or generating commands for taking corrective action related to adsorber process units, in accordance with one or more embodiments described herein. The graphical user interface may include an alert with information about a current state of a piece of equipment (e.g., an adsorber), a problem being experienced by a piece of equipment (e.g., an adsorber), a problem with a plant, or the like. For example, the graphical user interface may include an alert that an adsorber is experiencing a particular issue, an adsorber is operating at a particular level, a particular problem has been detected, or another alert.

The graphical user interface may include one or more buttons that, when pressed, cause one or more actions to be taken. For example, the graphical user interface may include a button that, when pressed, causes an operating characteristic (e.g., of an adsorber process unit, of a valve, of a plant, or the like) to change. In another example, the graphical user interface may include a button that, when pressed, sends an alert to a contact, the alert including information similar to the information included in the alert provided via the graphical user interface. For example, an alert may be sent to one or more devices, and one or more users of those devices may cause those devices to send alerts, further information, and/or instructions to one or more other devices. In a further example, the graphical user interface may include a button that, when pressed, shows one or more other actions that may be taken (e.g., additional corrective actions, adjustments to operating conditions).

Several levels of alerts may be utilized. One level of alerts may be for alerts that require emergency action (e.g., Level 1). Another level of alerts may be for alerts that require action, but not immediate action (e.g., Level 2). Another level of alerts may be for alerts that are not related to the adsorber unit (e.g., Level 3). A number of illustrative alerts are described below. These alerts are merely illustrative, and the disclosure is not limited to these alerts. Instead, these are merely examples of some of the types of alerts that may be related to, e.g., an adsorber process unit. As exemplified below, the alerts may identify the problem or issue and/or what corrective action (if any) may or should be taken.

An alert may include an indication of the alert level (e.g., level 1, level 2, level 3). The alert may include a name or identifier of the alert. The name or descriptive identifier of the alert may include a description of the determined problem that the alert is based on. The alert may include information on the determined problem. The alert may include information about potential causes of the determined problem. The alert may include a recommended further action (e.g., investigate and contact service representative). The alert may include information about who has received the alert. The alert may include an error code and/or error description for the error. The alert may include potential consequences of the error. The alert may include suggested actions for resolving the error.

Level 1 Alert: Moisture Breakthrough in Last 10% of Adsorption Time.

The system has detected a major concern relating to the dehydration unit. Please investigate and contact service representative. A copy of this alert has been sent to your service representative. Error: Moisture Breakthrough at End of Cycle.

Level 1 Alert: Moisture Breakthrough & High DP on Coldbox/JT-Valve (e.g., a Freeze Event).

The system has detected a major concern relating to the dehydration unit. Please investigate and contact service representative. A copy of this alert has been sent to your service representatives. Error: Moisture Breakthrough with Possible Hydrate Formation.

Level 2 Alert: Exceed Max H2O Capacity.

The system has detected a concern relating to the dehydration unit. Please investigate and take corrective actions. A copy of this alert has been sent to your service representative. Error: Exceeded Maximum Calculated Water Load. Potential Consequences: High risk of water breakthrough leading to unscheduled plant shut-down. Suggested Actions: Reduce feed flowrate and/or adsorption time to limit the amount of water.

Level 2 Alert: Adsorber Differential Pressure.

The system has detected a concern relating to the dehydration unit. Please investigate and take corrective actions. A copy of this alert has been sent to your service representative. Error: High Pressure Drop Across Adsorber Vessel (A/B/C). Potential Causes: Possible indication of liquid carryover, bed support failure, bed lifting, agglomeration, flow imbalance, or late stage attrition of sieve. Suggested Actions: Investigate potential causes, and continue operation. May require bed change-out.

Level 2 Alert: Filter Differential Pressure.

The system has detected a concern relating to the dehydration unit. Please investigate and take corrective actions. A copy of this alert has been sent to your service representative. Error: High Pressure Drop Across Dust Filter (A/B). Potential Causes: Possible indication of bed support failure, bed lifting, or late stage attrition of sieve. Suggested Actions: Investigate potential causes, change-out filter, and continue operation. May require bed change-out.

Level 2 Alert: Coldbox Differential Pressure.

The system has detected a concern relating to the cold box. Please investigate and take corrective actions. A copy of this alert has been sent to your service representative. Error: High Pressure Drop Coldbox. Potential Causes: Possible indication of solids accumulation, hydrate formation, or analytical error. Suggested Actions: Investigate potential causes, service moisture analyzer. May require plant shut-down.

Level 2 Alert: Minimum Heating Requirements.

The system has detected a concern relating to the dehydration unit. Please investigate and take corrective actions. A copy of this alert has been sent to your service representative. Error: Below Minimum Requirements of Regeneration Heating Bed (A/B/C). Potential Consequences: Underheating leaves higher moisture residual on the adsorber bed leading to early water breakthrough and unscheduled plant shut-down. Suggested Actions: Increase regeneration heating flowrate/time/temperature to match design conditions.

Level 2 Alert: Minimum Cooling Requirements.

The system has detected a concern relating to the dehydration unit. Please investigate and take corrective actions. A copy of this alert has been sent to your service representative. Error: Below Minimum Requirements of Regeneration Cooling Bed (A/B/C). Potential Consequences: Undercooling leaves higher than expected heat trapped in the adsorber vessel leading to a larger heat bump at beginning of adsorption step. Suggested Actions: Increase regeneration heating flowrate/time/temperature to match design conditions.

Level 2 Alert: Lift Regeneration Flow.

The system has detected a concern relating to the dehydration unit. Please investigate and take corrective actions. A copy of this alert has been sent to your service representative. Error: Regen flowrate Exceeds Lifting Limit. Potential Consequences: Lifting the adsorbent may cause bed support failure, adsorbent attrition, and adsorbent layer mixing (compound beds) leading to channeling and early moisture breakthrough. Any or all of these issues may lead to unscheduled plant shut-down. Suggested Actions: Watch for increased pressure drop, and potentially reduce adsorption flow/time. May require bed change-out.

Level 2 Alert: Minimum Regeneration Flow for Distribution.

The system has detected a concern relating to the dehydration unit. Please investigate and take corrective actions. A copy of this alert has been sent to your service representative mentioned below. Error: Regen flowrate Below Minimum for Distribution. Potential Consequences: Low heating flowrate may not properly regenerate the entire adsorbent bed leading to high moisture residual, and unscheduled plant shut-down. Suggested Actions: Increase regeneration heating flowrate to match design conditions.

Level 2 Alert: Forecasted EOL Date.

The system has detected a concern relating to the dehydration unit. Please investigate and take corrective actions. A copy of this alert has been sent to your service representative. Error: Installed Adsorbent has Exceeded Expected Bed Life. Potential Consequences: Operating this charge of adsorbent beyond designed bed life may result in unscheduled plant shut-down. Suggested Actions: Operate with caution until a new charge of adsorbent has been installed.

Level 2 Alert: Moisture Breakthrough (not at End of Cycle).

The system has detected a concern relating to the dehydration unit. Please investigate and take corrective actions. A copy of this alert has been sent to your service representative. Error: Moisture Breakthrough. Potential Causes: Possible indication of flow channeling in the online dehydration beds. If this error occurs alone, or during the middle of a cycle then it may also indicate an analytical error. Suggested Actions: Reduce adsorption time/feed flowrate, Investigate potential causes, service moisture analyzer, and watch for increasing coldbox DP.

Level 3 Alert: A Shutdown has been Detected that is not Directly Related to the Adsorber.

The system has detected an action relating to a unit other than the dehydration unit. Please investigate and take corrective actions, if necessary. A copy of this alert has been sent to your service representative. Alert: shutdown. This alert may include information identifying the unit that shutdown and/or the unit that caused the shutdown.

Level 3 Alert: The Unit has Started Up.

The system has detected an action relating to a unit other than the dehydration unit. Please investigate and take corrective actions, if necessary. A copy of this alert has been sent to your service representative. Alert: startup. This alert may include information identifying the unit that started up and/or the unit that initiated the startup.

CONCLUSION

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps illustrated in the illustrative figures may be performed in other than the recited order, and one or more depicted steps may be optional in accordance with aspects of the disclosure.

What is claimed is:

1. A system comprising:
a plant comprising an adsorber process unit;
one or more sensors configured to measure operating information for the adsorber process unit;
a data collection platform comprising:
one or more processors of the data collection platform;
a communication interface of the data collection platform and in communication with the one or more sensors; and
non-transitory computer-readable memory storing executable instructions that, when executed, cause the data collection platform to:
receive sensor data comprising the operating information for the adsorber process unit;
correlate the sensor data with metadata comprising time data; and
transmit the sensor data to a data analysis platform;
the data analysis platform comprising:
one or more processors of the data analysis platform;
non-transitory computer-readable memory storing executable instructions that, when executed, cause the data analysis platform to:
receive the sensor data from the data collection platform;
analyze the sensor data; and
based on the analyzed sensor data, transmit a command for an adjustment to an operating condition related to the adsorber process unit;
a control platform comprising:
one or more processors of the control platform;
non-transitory computer-readable memory storing executable instructions that, when executed, cause the control platform to:
receive the command for the adjustment to the operating condition related to the adsorber process unit; and
adjust the operating condition related to the adsorber process unit.

2. The system of claim 1, wherein the executable instructions of the data analysis platform, when executed, cause the data analysis platform to:
monitor an amount of water being adsorbed in an adsorbent bed of the adsorber process unit; and
determine, based on the amount of water being adsorbed in the adsorbent bed of the adsorber process unit, whether the adsorber process unit needs to be taken offline and adsorber of the adsorber process unit regenerated.

3. The system of claim 1, wherein the executable instructions of the data analysis platform, when executed, cause the data analysis platform to:
transmit a command for an adjustment to a cycle time of the adsorber process unit.

4. The system of claim 1, wherein the executable instructions of the data analysis platform, when executed, cause the data analysis platform to:
determine an optimal operating characteristic of the adsorber process unit;
determine whether there is a difference between a last-cycle operating performance of the adsorber process unit and the optimal operating characteristic of the adsorber process unit; and
based on determining that there is the difference between the last-cycle operating performance of the adsorber process unit and the optimal operating characteristic of the adsorber process unit, determine the adjustment to the operating condition related to the adsorber process unit.

5. The system of claim 4, wherein the executable instructions of the data analysis platform, when executed, cause the data analysis platform to:
determine an optimal cycle time of the adsorber process unit as part of determining the optimal operating characteristic of the adsorber process unit.

6. The system of claim 4, wherein the executable instructions of the data analysis platform, when executed, cause the data analysis platform to:
determine the adjustment to the operating condition related to the adsorber process unit, the adjustment configured to decrease a difference between an actual operating performance of the adsorber process unit and the optimal operating characteristic of the adsorber process unit.

7. The system of claim 6, wherein the executable instructions of the data analysis platform, when executed, cause the data analysis platform to:
after a next cycle of the adsorber process unit, determine a new last-cycle operating performance of the adsorber process unit; and
based on the new last-cycle operating performance of the adsorber process unit, determine whether the difference between the actual operating performance of the adsorber process unit and the optimal operating characteristic of the adsorber process unit has decreased.

8. The system of claim 1, wherein the executable instructions of the data analysis platform, when executed, cause the data analysis platform to:
transmit a command configured to cause an adjustment to a capacity of the adsorber process unit.

9. The system of claim 1, wherein the executable instructions of the data analysis platform, when executed, cause the data analysis platform to:
transmit a command configured to cause an adjustment to an amount of feed for the adsorber process unit.

10. The system of claim 1, comprising:
a dashboard configured to:
display the sensor data comprising the operating information for the adsorber process unit; and
display the adjustment to the operating condition related to the adsorber process unit.

11. The system of claim 10, wherein the dashboard is configured to:
display an optimum level at which the adsorber process unit should be operated to achieve an optimization goal for the adsorber process unit.

12. The system of claim 10, wherein the dashboard is configured to:
display an amount of adsorption achieved by the adsorber process unit in a particular time; and
display an amount of water load that an adsorber system is under at a given point in time.

13. A method comprising:
receiving, by a data analysis computing device, sensor data for a sensor associated with an adsorber process unit;

based on analyzing the sensor data, determining, by the data analysis computing device, an ideal operating condition for an element of the adsorber process unit;

determining, by the data analysis computing device, a difference between a most recent operating condition for the element of the adsorber process unit and the ideal operating condition for the element of the adsorber process unit;

based on the analyzed sensor data, determining, by the data analysis computing device, a command for adjusting the element of the adsorber process unit to reduce the difference between the most recent operating condition and the ideal operating condition; and sending, by the data analysis computing device, the command for adjusting the element of the adsorber process unit.

14. The method of claim 13, comprising:

monitoring an amount of water being adsorbed in an adsorbent bed of the adsorber process unit; and determining, based on the amount of water being adsorbed in the adsorbent bed of the adsorber process unit, whether the adsorber process unit needs to be taken offline and adsorber of the adsorber process unit regenerated.

15. The method of claim 13, comprising:

determining an optimal operating characteristic of the adsorber process unit;

determining whether there is a difference between a last-cycle operating performance of the adsorber process unit and the optimal operating characteristic of the adsorber process unit; and based on determining that there is the difference between the last-cycle operating performance of the adsorber process unit and the optimal operating characteristic of the adsorber process unit, determining the adjustment to the operating condition related to the adsorber process unit.

16. The method of claim 13, comprising:

generating a dashboard configured to:
    display the sensor data comprising operating information for the adsorber process unit;
    display the adjustment to the operating condition related to the adsorber process unit;
    display an optimum level at which the adsorber process unit should be operated to achieve an optimization goal for the adsorber process unit;
    display an amount of adsorption achieved by the adsorber process unit in a particular time; and
    display an amount of water load that an adsorber system is under at a given point in time.

17. Non-transitory computer-readable media storing executable instructions that, when executed by one or more processors, cause a system to:

receive sensor data for a sensor associated with an adsorber process unit;

based on analyzing the sensor data, determine an ideal operating condition for an element of the adsorber process unit;

determine a difference between a most recent operating condition for the element of the adsorber process unit and the ideal operating condition for the element of the adsorber process unit;

based on the analyzed sensor data, determine a command for adjusting the element of the adsorber process unit to reduce the difference between the most recent operating condition and the ideal operating condition; and send the command for adjusting the element of the adsorber process unit.

18. The non-transitory computer-readable media of claim 17, wherein the executable instructions, when executed, cause the system to:

monitor an amount of water being adsorbed in an adsorbent bed of the adsorber process unit; and determine, based on the amount of water being adsorbed in the adsorbent bed of the adsorber process unit, whether the adsorber process unit needs to be taken offline and adsorber of the adsorber process unit regenerated.

19. The non-transitory computer-readable media of claim 17, wherein the executable instructions, when executed, cause the system to:

determine an optimal operating characteristic of the adsorber process unit;

determine whether there is a difference between a last-cycle operating performance of the adsorber process unit and the optimal operating characteristic of the adsorber process unit; and based on determining that there is the difference between the last-cycle operating performance of the adsorber process unit and the optimal operating characteristic of the adsorber process unit, determine the adjustment to the operating condition related to the adsorber process unit.

20. The non-transitory computer-readable media of claim 17, wherein the executable instructions, when executed, cause the system to:

generate a dashboard configured to:
    display the sensor data comprising operating information for the adsorber process unit;
    display the adjustment to the operating condition related to the adsorber process unit;
    display an optimum level at which the adsorber process unit should be operated to achieve an optimization goal for the adsorber process unit;
    display an amount of adsorption achieved by the adsorber process unit in a particular time; and
    display an amount of water load that an adsorber system is under at a given point in time.

* * * * *